(12) United States Patent
Chakraborty et al.

(10) Patent No.: US 11,621,730 B2
(45) Date of Patent: Apr. 4, 2023

(54) TRANSMITTERS WITH DYNAMIC RANGES EXTENDING BEYOND SUPPLY RAILS

(71) Applicant: International Business Machines Corporation, Armonk, NY (US)

(72) Inventors: Sudipto Chakraborty, Plano, TX (US); Rajiv Joshi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/171,386

(22) Filed: Feb. 9, 2021

(65) Prior Publication Data
US 2022/0255566 A1  Aug. 11, 2022

(51) Int. Cl.
H04B 1/00 (2006.01)
H04B 1/04 (2006.01)
H04B 1/40 (2015.01)

(52) U.S. Cl.
CPC ......... H04B 1/0032 (2013.01); H04B 1/0039 (2013.01); H04B 1/04 (2013.01); H04B 1/0483 (2013.01); H04B 1/40 (2013.01)

(58) Field of Classification Search
CPC .. H04B 1/0028; H04B 1/0032; H04B 1/0035; H04B 1/0039; H04B 1/02; H04B 1/04; H04B 7/04; H04B 7/0404; H04B 7/0613; H04B 7/0615; H04B 7/0667; H04L 27/04; H04L 27/12; H04L 27/125; H04L 27/20
USPC ................ 375/295, 299–301, 306, 307, 312; 332/103–105, 108, 119, 138, 139, 151; 455/500, 101–105, 109, 127.1, 127.3
See application file for complete search history.

(56) References Cited

U.S. PATENT DOCUMENTS

| 5,241,694 | A | 8/1993 | Väis/änen et al. |
| 6,005,500 | A * | 12/1999 | Gaboury ................. H03M 3/46 341/118 |
| 6,208,247 | B1 | 3/2001 | Agre et al. |
| 6,766,158 | B1 * | 7/2004 | Molnar .................... H04B 1/28 331/46 |

(Continued)

FOREIGN PATENT DOCUMENTS

| CN | 105704799 A | 6/2016 |
| EP | 2763321 A1 | 8/2014 |
| WO | 2009026469 A1 | 2/2009 |

OTHER PUBLICATIONS

L. Huang et al., "Ultra-Low Power Sensor Design for Wireless Body Area Networks: Challenges, Potential Solutions, and Applications," Journal of Digital Content Technology and its Applications (JDCTA) Jan. 2009, vol. 3, pp. 136-148.

(Continued)

*Primary Examiner* — Young T. Tse
(74) *Attorney, Agent, or Firm* — Samuel Waldbaum; Ryan, Mason & Lewis, LLP

(57) ABSTRACT

An apparatus includes a plurality of signal processing stages configured to convert a digital baseband signal into an analog radio frequency signal for transmission. The signal processing stages are configured to be operatively coupled to a positive supply voltage and a negative supply voltage. At least one signal processing stage of the plurality of signal processing stages is configured to generate an analog voltage signal which comprises a voltage level that is outside of a voltage range defined by the positive supply voltage and the negative supply voltage.

20 Claims, 13 Drawing Sheets

(56) References Cited

U.S. PATENT DOCUMENTS

| | | | |
|---|---|---|---|
| 7,787,846 | B1 | 8/2010 | Page et al. |
| 9,621,202 | B2 | 4/2017 | van der Tang et al. |
| 10,778,189 | B1 | 9/2020 | Dey |
| 2004/0071225 | A1* | 4/2004 | Suzuki .................. H03F 1/0227 375/297 |
| 2007/0290980 | A1* | 12/2007 | Lin ...................... G09G 3/3688 345/100 |
| 2015/0179232 | A1* | 6/2015 | Felix ..................... G11C 11/419 365/154 |
| 2015/0373643 | A1* | 12/2015 | Talty .................... H04B 1/0475 370/311 |
| 2019/0028089 | A1 | 1/2019 | R R |

OTHER PUBLICATIONS

W. Jung et al., "An Ultra-Low Power Fully Integrated Energy Harvester Based on Self-Oscillating Switched-Capacitor Voltage Doubler," IEEE Journal of Solid-State Circuits, Dec. 2014, vol. 49, No. 12, pp. 2800-2811.

C. H.-I. Kim et al., "Ultra-Low-Power DLMS Adaptive Filter for Hearing Aid Applications," IEEE Transactions on Very Large Scale Integration (VLSI) Systems, Dec. 2003, vol. 11, No. 6, pp. 1058-1067.

Y.-S. Lin et al., "A 150pW Program-and-Hold Timer for Ultra-Low-Power Sensor Platforms," IEEE International Solid-State Circuits Conference—Digest of Technical Papers (ISSCC), Feb. 8-12, 2009, pp. 326-328.

D. C. O'Brien et al., "Energy Scavenging Sensors for Ultra-low Power Sensor Networks," Proceedings of SPIE—The International Society for Optical Engineering, Aug. 2010, vol. 7814, 9 pages.

Y. K. Ramadass et al., "An Efficient Piezoelectric Energy Harvesting Interface Circuit Using a Bias-Flip Rectifier and Shared Inductor," IEEE Journal of Solid-State Circuits, Jan. 2010, vol. 45, No. 1, pp. 189-204.

M. D. Seeman et al., "An Ultra-Low-Power Power Management IC for Energy-Scavenged Wireless Sensor Nodes," IEEE Power Electronics Specialists Conference, Jun. 15-19, 2008, pp. 925-931.

International Search Report and Written Opinion of PCT/EP2022/051498, dated May 25, 2022, 13 pages.

L.-H. Wang et al., "Implementation ofa Wireless ECG Acquisition SoC for IEEE 802.15.4 (ZigBee) Applications," IEEE Journal of Biomedical and Health Informatics, Jan. 1, 2015, pp. 247-255, vol. 19, No. 1.

P. Chen et al., "A 31-µW, 148-fs Step, 9-bit Capacitor-DAC-Based Constant-Slope Digital-to-Time Converter in 28-nm CMOS," IEEE Journal of Solid-State Circuits, Nov. 1, 2019, pp. 3075-3085, vol. 54, No. 11.

I. Myderrizi et al., "Current-Steering Digital-to-Analog Converters: Functional Specifications, Design Basics, and Behavioral Modeling," IEEE Antennas and Propagation Magazine, Aug. 1, 2010, pp. 197-208, vol. 52, No. 4.

\* cited by examiner

400

410

700

US 11,621,730 B2

TRANSMITTERS WITH DYNAMIC RANGES EXTENDING BEYOND SUPPLY RAILS

BACKGROUND

This disclosure relates generally to transmitters and sensor nodes which implement transmitters in a sensor network. A wireless sensor network typically comprises a plurality of sensor nodes that are distributed within a given physical environment to operate in a cooperative manner to monitor one or more physical conditions or events that occur within the given environment. In a wireless sensor network environment, the power consumption of the sensor nodes should be limited when the sensor nodes operate and communicate with neighbor sensor nodes or other nodes in the network environment. In this regard, the power consumption of radio frequency (RF) transmitters or transceivers which are implemented by the sensor nodes should be limited to prolong the limited power supply capacity (e.g., battery capacity) of the sensor nodes.

SUMMARY

An exemplary embodiment of the disclosure includes an apparatus which comprises a plurality of signal processing stages configured to convert a digital baseband signal into an analog radio frequency signal for transmission. The signal processing stages are configured to be operatively coupled to a positive supply voltage and a negative supply voltage, wherein at least one signal processing stage of the plurality of signal processing stages is configured to generate an analog voltage signal which comprises a voltage level that is outside of a voltage range defined by the positive supply voltage and the negative supply voltage.

Other embodiments will be described in the following detailed description of exemplary embodiments, which is to be read in conjunction with the accompanying figures.

DETAILED DESCRIPTION

Figure 1:
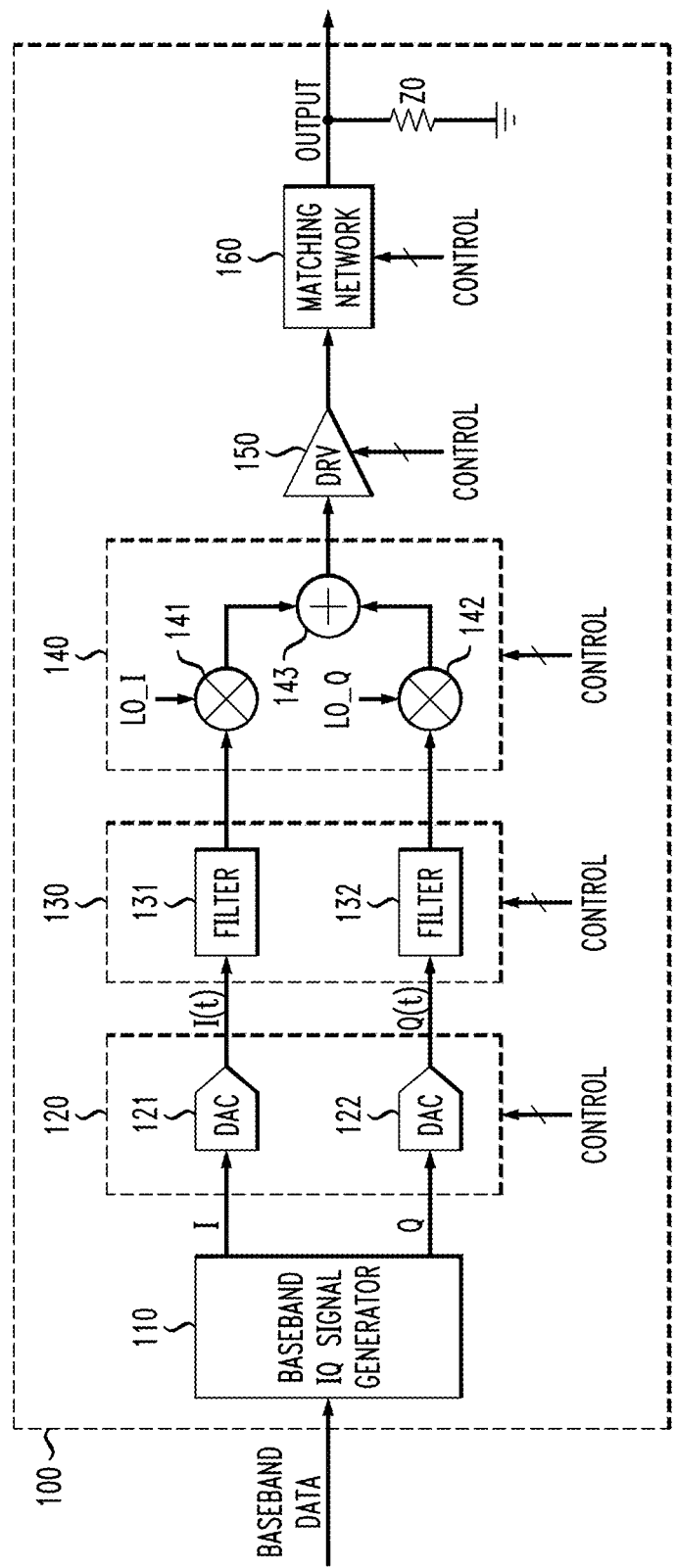
FIG. 1 schematically illustrates a transmitter, according to an exemplary embodiment of the disclosure.

Exemplary embodiments of the disclosure will now be described in further detail with regard to transmitters with dynamic ranges that extend beyond voltage supply rails. More specifically, exemplary embodiments of the disclosure include transmitters which comprise signal processing stages that are configured to generate analog voltage signals with voltage levels that extend beyond a supply voltage rail (e.g., a negative supply voltage rail or a positive supply voltage rail). For example, in some embodiments, an ultra-low power transmitter comprises a plurality of signal processing stages configured to convert a digital baseband signal into an analog radio frequency signal for transmission. The signal processing stages are configured to be operatively coupled to a positive supply voltage and a negative supply voltage, wherein at least one signal processing stage of the plurality of signal processing stages is configured to generate an analog voltage signal which includes a voltage level (e.g., a peak voltage level or an average voltage level) that is less than the negative supply voltage. In other embodiments, a transmitter comprises a plurality of signal processing stages configured to convert a digital baseband signal into an analog radio frequency signal for transmission, wherein at least one signal processing stage of the plurality of signal processing stages is configured to generate an analog voltage signal which includes a voltage level (e.g., a peak voltage level or an average voltage level) that is greater than the positive supply voltage.

It is to be understood that the various features as shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration". Any embodiment or design described herein as "exemplary" is not to be construed as preferred or advantageous over other embodiments or designs.

Further, it is to be understood that the phrase "configured to" used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, the hardware may comprise discrete circuit elements (e.g., transistors, inverters, etc.), programmable elements (e.g., ASICs, FPGAs, etc.), processing devices (e.g., CPUs, GPUs, etc.), one or more integrated circuits, and/or combinations thereof. Thus, by way of example only, when a circuit is defined to be configured to provide a specific functionality, it is intended to cover, but not be limited to, embodiments where the circuit is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit is in a non-operational state (e.g., not connected nor otherwise deployed in a system, not powered on, not receiving an input, and/or not producing an output) or in a partial operational state.

FIG. 1 schematically illustrates a transmitter 100, according to an exemplary embodiment of the disclosure. In particular, FIG. 1 schematically illustrates a single-channel transmitter 100 which comprises a baseband signal generator 110, a digital-to-analog converter stage 120 (or DAC stage 120), a filter stage 130, a modulation stage 140, an amplifier driver stage 150, and an impedance matching network 160. The DAC stage 120 comprises inputs that are coupled to outputs of the baseband signal generator 110. The filter stage 130 comprises inputs that are coupled to outputs of the DAC stage 120. The modulation stage 140 comprises inputs that are coupled to outputs of the filter stage 130. The amplifier driver stage 150 comprises an input that is coupled to an output of the modulation stage 140, and an output that is coupled to an input of the matching network 160. The matching network 160 comprises an output that is connected to an output node of the transmitter 100. In some embodiments, the output of the transmitter 100 is coupled to an antenna system which is configured to transmit an RF output signal that is generated by the transmitter 100. In other embodiments, the transmitter 100 comprises a waveform generator (e.g., an arbitrary waveform generator, or a function generator) in which the output of the transmitter 100 is coupled to an input of a sensor device, wherein the RF output signal that is generated by the transmitter 100 is configured to excite the sensor device.

As further shown in FIG. 1, the various signal processing stages 120, 130, 140, 150, and 160 of the transmitter 100 comprise control signal input ports that receive digital control signals from a microcontroller which is configured to control operation of the transmitter 100. In some embodiments, some or all of the stages 120, 130, 140, 150, and 160 have a configurable hardware framework in which various operating parameters of the stages can be adjusted by the digital control signals. Furthermore, in some embodiments, the active components of the various signal processing stages have control circuitry that is configured to control powering up and powering down of circuit blocks in the signal processing stages in response to the digital control signals to thereby selectively activate circuit blocks of the signal processing stages for different operating modes of the transmitter 100. In some embodiments, the control circuitry for controlling the powering up and the powering down circuit blocks of the signal processing stages can be implemented using an open drain circuit topology, as is known in the art. In other embodiments, circuit blocks of the signal processing stages can be powered up or powered down by implementing switching circuitry that is configured to control the flow of quiescence current (or operating current) of active components of the various circuit blocks such that a given circuit block can be powered down by cutting off the flow operating current.

In the context of the exemplary embodiments discussed herein, an RF signal comprises a signal which has a frequency ranging from, e.g., about 20 kHz to about 300 GHz, such that the energy of oscillating signals (e.g., current signals) at RF frequencies can radiate from a conductor into space as radio waves. In some embodiments, the transmitter 100 comprises a quadrature transmitter which is configured to process quadrature signals (referred to as IQ signals). As is known in the art, a quadrature signal comprises an in-phase (I) signal component, and a quadrature-phase (Q) signal component. A pair of signals that are in quadrature have the same frequency, but differ in phase by 90 degrees. For illustrative purposes, exemplary embodiments of the disclosure will be described in the context of quadrature transmitter systems, although the exemplary signal processing circuitry and methods as discussed herein can be implemented with other types of transmitters and modulation techniques.

FIG. 1 illustrates an exemplary embodiment in which the transmitter 100 comprises an RF analog quadrature transmitter. The baseband signal generator 110 is configured to receive baseband data as input (e.g., sensor data) and generate digital quadrature signals I and Q which represent the input baseband data. In this process, the baseband data that is input to the baseband signal generator 110 is separated into two orthogonal digital components including an in-phase (I) baseband component and a quadrature-phase (Q) baseband component. In some embodiments, the baseband signal generator 110 implements digital signal processing techniques based on a combination of hardware and software to generate the digital quadrature baseband signals I and Q.

In some embodiments, the input baseband data comprises digital baseband data which is generated by another signal processor that is configured to process output signals from sensor devices and generate the baseband data. In other embodiments, the functions of the baseband signal generator 110 can be implemented in a separate digital signal processor which perform various functions including, but not limited to, digital signal processing the sensor data received from the sensor and generating the digital quadrature baseband IQ signals. In this regard, while the exemplary embodiment of FIG. 1 illustrates the baseband signal generator 110 as a component of the transmitter 100, it is to be understood that in other embodiments, the baseband signal generator 110 is a system component (e.g., digital signal processor) that is separate from the transmitter 100. In other embodiments, where the transmitter 100 is implemented as a waveform generator, the baseband signal generator 110 will generate the requisite digital quadrature baseband IQ signals which are needed to generate an analog waveform (e.g., sinusoidal voltage waveform) with a target center frequency that is configured to operate or otherwise excite a sensor device that is coupled to the output of the transmitter.

The DAC stage 120 is configured to convert a digital baseband signal (e.g., a digital IQ signal output from the baseband signal generator 110) to an analog baseband signal having a baseband frequency. The DAC stage 120 comprises a first DAC circuit 121 and a second DAC circuit 122. The first DAC circuit 121 is configured to convert the digital baseband component I to an analog baseband component I(t) having a baseband frequency, and the second DAC circuit 122 is configured to convert the digital baseband component Q to an analog baseband component Q(t) having the same baseband frequency, but phase-shifted by 90 degrees relative to I(t). The DAC stage 120 generates and outputs the analog baseband signals I(t) and Q(t) at a given sampling rate ($f_S$) or sampling frequency which, in some embodiments, is in a range of baseband frequencies of about 100 kHz to about 100 MHz.

Based on the Nyquist Sampling Theorem, the highest fundamental output frequency $f_O$ signal a DAC with sampling frequency $f_S$ can generate is equal to half the sampling rate or $f_S/2$ (referred to as the first Nyquist zone). In the frequency domain, when generating a sinusoidal waveform of frequency $f_O$, the fundamental baseband frequency $f_O$ will appear as a spectral component at $f_O$, and there will be additional higher frequency components that are generated at the output of the DAC stage 120, which are referred to as "images" and which are a function $f_S$ and $f_O$. For example, the higher frequency components are determined as |n× ($f_S \pm f_O$)|, where n=1, 2, 3, . . . . The images have the same information content as the fundamental spectral components, but at higher frequencies and at smaller amplitudes. The unwanted images are suppressed/rejected using, e.g., the downstream filter stage 130.

Figure 2A:
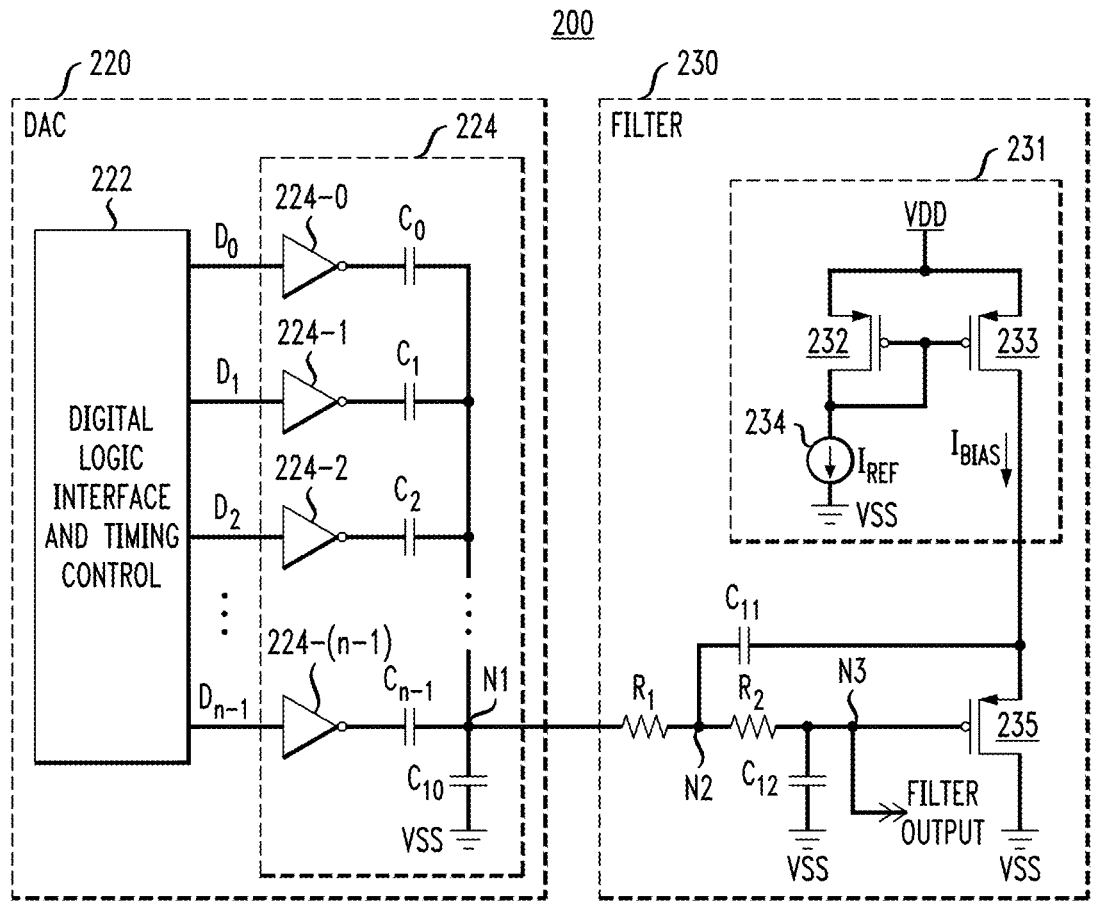
FIG. 2A schematically illustrates a digital-to analog converter (DAC) circuit and a filter circuit, according to an exemplary embodiment of the disclosure.
Figure 5:
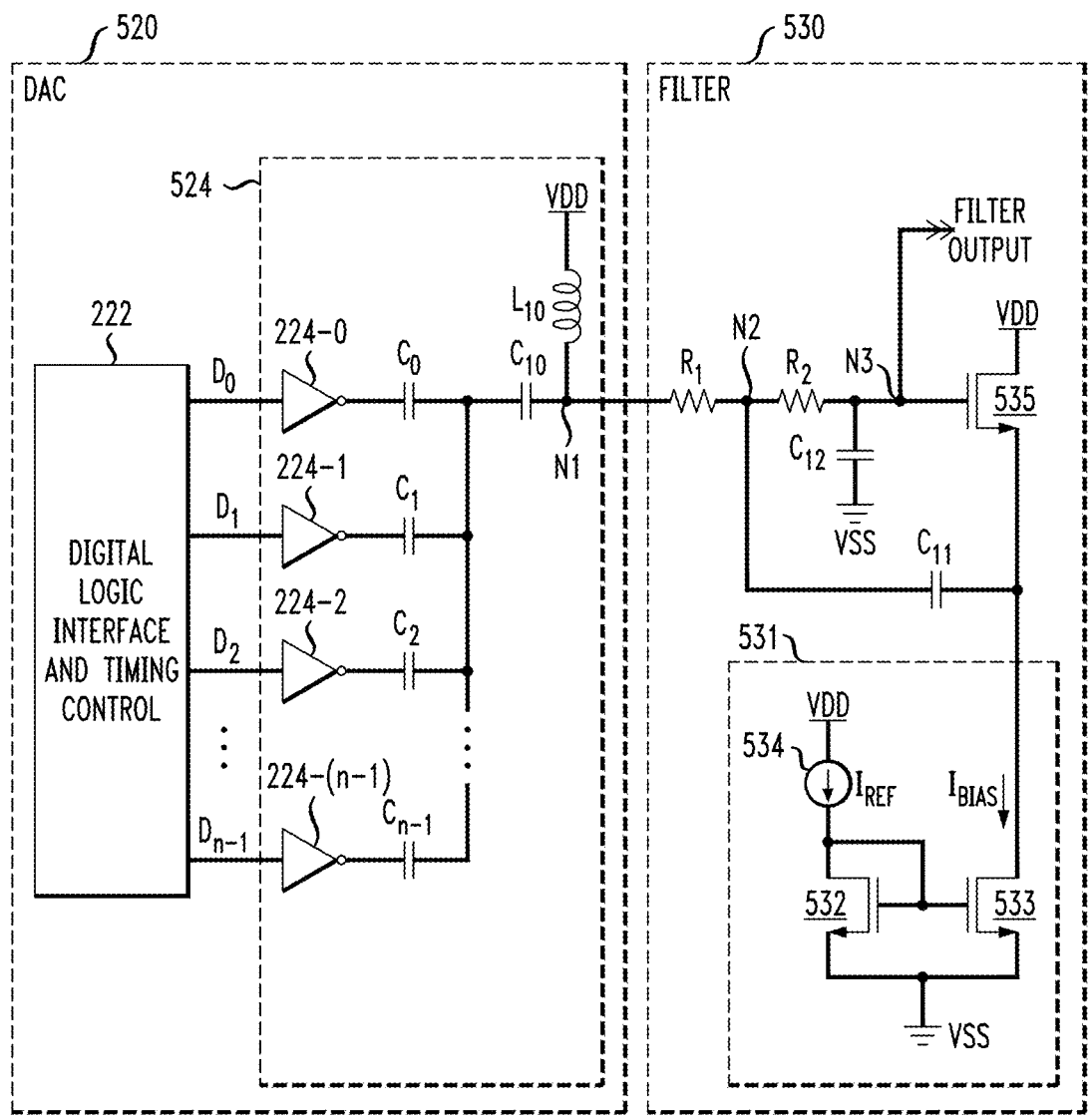
FIG. 5 schematically illustrates a DAC circuit and a filter circuit, according to another exemplary embodiment of the disclosure.

In some embodiments, the first and second DAC circuits 121 and 122 are implemented using a voltage-mode DAC framework in which an analog output is a voltage waveform. More specifically, in some embodiments, the first and second DAC circuits 121 and 122 are implemented using an exemplary capacitance-based DAC framework as shown in FIG. 2A in which the first and second DAC circuits 121 and 122 are configured to generate an analog voltage signal which comprises a voltage level (e.g., peak voltage level, an average voltage level, etc.) that is less than a negative supply voltage (or negative supply rail). In other embodiments, the first and second DAC circuits 121 and 122 are implemented using an exemplary capacitance-based DAC framework as shown in FIG. 5 in which the first and second DAC circuits 121 and 122 are configured to generate an analog voltage signal which comprises a voltage level (e.g., peak voltage level, an average voltage level, etc.) that is greater than a positive supply voltage (or positive supply rail). The details of the exemplary DAC circuits shown in FIGS. 2A and 5 will be discussed in further detail below.

In some embodiments, the first and second DAC circuits 121 and 122 implement a configurable hardware framework in which various operating parameters of the DAC stage 120 can be adjusted by digital control through, e.g., the digital control signals that are input to the DAC stage 120. For example, in some embodiments, the digital control can be utilized to adjust DAC operating parameters including, but not limited to, the sampling rate, analog output gain, etc. In this regard, the first and second DAC circuits 121 and 122 can be configured to have a desired gain and sampling frequency to achieve a desired RF transmission power and RF transmission frequency when, for instance, the transmitter 100 is operating in a baseband transmission mode in in which the modulation stage 140 is not operable and utilized to upconvert the baseband frequency to a higher RF transmission frequency, as discussed in further detail below.

For example, a higher DAC sampling frequency can be utilized as needed to transmit baseband data and/or relax the filter response of the downstream filters of the filter stage 130. Indeed, an increase in the DAC sampling frequency results in the possibility of accommodating higher baseband transmission frequency (i.e., the analog baseband components I(t) and Q(t) have a higher baseband frequency). In addition, an increase in the DAC sampling frequency results in an increase in the separation between the center frequency $f_O$ of the baseband component and the center frequencies $f_S \pm f_O$ of the higher frequency images, which relaxes the required sharpness of filter cutoffs at corner frequencies of the filters. However, the higher DAC sampling rate results in increased power consumption. So, a tradeoff in power consumption with lower DAC sampling frequency, and the sharpness of the filter cutoffs at the corner frequencies of the filters are factors that are considered.

The filter stage 130 is configured to the filter the IQ analog signal components output from the DAC stage 120 to thereby generate filtered analog IQ signals. The filter stage 130 comprises a first filter circuit 131 and a second filter circuit 132. The first filter circuit 131 is configured to filter the in-phase analog signal I(t) output from first DAC circuit 121, and the second filter circuit 132 is configured to filter the quadrature-phase analog signal Q(t) output from the second DAC circuit 122. In some embodiments, the first and second filter circuits 131 and 132 comprise low-pass filters that are configured to pass the fundamental spectral components of the respective analog signals I(t) and Q(t), while suppressing the image components of the respective analog signals I(t) and Q(t). In some embodiments, the first and second filter circuits 131 and 132 are implemented using an analog biquadratic low-pass filter circuit framework as shown in FIG. 2A or FIG. 5. An analog biquadratic low-pass filter circuit having an architecture as shown in FIG. 2A is configured to generate a filtered analog voltage signal which comprises a voltage level (e.g., an average voltage level, a peak voltage level, etc.) that is less than a negative supply voltage VSS, while an analog biquadratic low-pass filter circuit having an architecture as shown in FIG. 5 is configured to generate a filtered analog voltage signal which comprises a voltage level (e.g., average voltage level, a peak voltage level, etc.) that is greater than a positive supply voltage VDD. The details of the exemplary low-pass filter circuits shown in FIGS. 2A and 5 will be discussed in further detail below.

In other embodiments, the first and second filter circuits 131 and 132 can be configured as bandpass filters to pass a desired band of higher frequency image components of the respective analog baseband components I(t) and Q(t), while suppressing the fundamental spectral components and other image components of the respective analog baseband components I(t) and Q(t). In other embodiments, the first and second filter circuits 131 and 132 are configured as highpass filters, as may be desired for a given application. In some embodiments, the filter stage 130 comprises configurable filter circuits in which, e.g., the cutoff frequencies of the first and second filter circuits 131 and 132 can be adjusted, or where the first and second filter circuits 131 and 132 can be configured to have different filter types (e.g., low-pass, band-pass, etc.) as desired for a given application. For example, in some embodiments, a bandpass filter can be configured using two low pass filters using known signal filtering techniques and architectures. In some embodiments, the filter configurations are digitally controlled by the digital control signals that are input to the filter stage 130.

In some embodiments, the modulation stage 140 is configured to perform analog IQ signal modulation (e.g., single-sideband (SSB) modulation) by mixing the filtered analog signals I(t) and Q(t), which are output from the filter stage 130, with quadrature LO signals (e.g., an in-phase LO signal (LO_I) and a quadrature-phase LO signal (LO_Q)) to generate and output an analog RF signal (e.g., a single-sideband modulated RF output signal). The local oscillator signals LO_I and LO_Q signals each have the same LO frequency, but the LO_Q signal is phase-shifted by 90 degrees relative to the LO_I signal. More specifically, the modulation stage 140 comprises a first mixer circuit 141, a second mixer circuit 142, and a signal combiner circuit 143. The first mixer circuit 141 is configured to mix the filtered analog signal I(t) with the LO_I signal and generate a first RF signal output. The second mixer circuit 142 is configured to mix the filtered analog signal Q(t) with the LO_Q signal and generate a second RF signal output. The first and second RF signals output from the first and second mixer circuits 141 and 142 are input to the signal combiner circuit 143 and combined (e.g., added) to generate a single-sideband RF signal output.

In some embodiments, a quadrature phase shifter circuit is implemented in the transmitter 100 to generate the quadrature LO_I and LO_Q signals. For example, a quadrature phase shifter circuit is configured to receive an LO signal as input, and output the quadrature LO signals LO_I and LO_Q based on the LO input signal. In this configuration, the LO_I signal comprises the same frequency and phase as the input LO signal, and the LO_Q signal comprises the same frequency as the input LO signal, but with a phase shift of 90 degrees. The quadrature phase shifter circuit can be implemented using one of various quadrature phase shifting techniques known to those of ordinary skill in the art.

The modulation stage 140 performs an up-conversion modulation process which is configured to generate an RF analog signal which has a center frequency that is greater than the baseband frequency of the baseband signals output from the DAC stage 120. In some embodiments, the LO frequency of the modulation stage 140 is in a range of 100 MHz to about 10 GHz, depending on the application. More specifically, as is understood by those of ordinary skill in the art, as a result of the mixing operations of the first and second mixers 141 and 142, the first and second RF signals that are output from the respective first and second mixers 141 and 142 each comprise a double-sideband RF signal. A double-sideband signal comprises an upper sideband (USB) and a lower sideband (LSB) which are disposed at equal distances above and below the LO frequency. The upper sideband comprises a spectral band of frequencies that is higher than the LO frequency, and the lower sideband comprises a spectral band of frequencies that is lower than the LO frequency. The upper and lower sidebands each carry the same information content of the IQ signals. For example, assume that the filtered analog signals I(t) and Q(t) (i.e., the modulating signals) have a center frequency $f_M$, and that the LO signal has a frequency $f_{LO}$. The first and second RF signals that are output from the first and second mixers 141 and 142 will each have (i) an upper sideband of spectral components, which is frequency-band centered at a frequency of $(f_{LO}+f_M)$ and (ii) a lower sideband of spectral components, which is frequency-band centered at a frequency of $(f_{LO}-f_M)$.

In some embodiments, the signal combiner 143 is configured to add the first and second RF signals which are output from the first and second mixers 141 and 142, in which case the signal combiner 143 will output the "real" lower sideband signal as a single-sideband modulated RF signal (with a suppressed carrier) having a center frequency which is upconverted from the frequency $f_M$ the modulating signals I(t) and Q(t) to a center frequency $(f_{LO}-f_M)$ of the lower sideband. In other embodiments, the signal combiner 143 is configured to subtract the first and second RF signals which are output from the first and second mixers 141 and 142, in which case the signal combiner 143 will output the "real" upper sideband signal as a single-sideband modulated RF signal (with a suppressed carrier) having a center frequency which is upconverted from the frequency $f_M$ of the modulating signals I(t) and Q(t) to a center frequency $(f_{LO}+f_M)$ of the upper sideband.

In other embodiments, the modulation stage 140 is configured as a double-sideband modulator (with a suppressed carrier). More specifically, the modulation stage 140 can be configured to provide double-sideband modulation by maintaining the LO_Q input to the second mixer 142 at a constant zero voltage level (i.e., LO_Q=0). In this instance, the second mixer 142 will have a zero output (i.e., no RF signal is output from the second mixer 142), and the output of the signal combiner 143 will be the double-sideband RF signal output from the first mixer 141. For example, to illustrate an IQ modulation process which is performed by the modulation stage 140, assume that (i) the in-phase signals are cosine waveforms, (ii) the quadrature-phase signals are sine waveforms, (iii) the analog baseband components I(t) and Q(t) have a baseband frequency $f_M$ (denoted as B), and (iv) the LO_I and LO_Q signals have an LO frequency $f_{LO}$ (denoted as A). With this exemplary notation, the analog baseband signal I(t) is denoted as cos(B), the analog baseband signal Q(t) is denoted sin(B), the LO_I signal is denoted as cos(A), and the LO_Q signal is denoted as sin(B).

Based on product-to-sum trigonometric identities, the following operations are performed by the first and second mixers 141 and 142 of the modulation stage 140. The first mixer 141 mixes the analog in-phase baseband signal I(t) with the LO_I signal by the following multiplication process: cos(A)cos(B)=½[cos(A−B)+cos(A+B)]. The second mixer 142 mixes the analog quadrature-phase baseband signal Q(t) with the LO_Q signal by the following multiplication process: sin(A)sin(B)=½[cos(A−B)−cos(A+B)].

Further, in some embodiments, the signal combiner 143 adds the signals that are output from the first and second mixers 141 and 142 to generate a single-sideband RF output signal ($RF_{OUT}$) as follows: $RF_{OUT}$=(½ [cos(A−B)+cos(A+B)])+(½[cos(A−B)−cos(A+B)])=cos(A−B). In other embodiments, the signal combiner 143 subtracts the signals that are output from the first and second mixers 141 and 142 to generate a single-sideband RF output signal ($RF_{OUT}$) as follows: $RF_{OUT}$=(½ [cos(A−B)+cos(A+B)])−(½ [cos(A−B)−cos(A+B)])=cos(A+B).

The amplifier driver stage 150 is configured to receive the modulated RF signal, which is output from the modulation stage 140, and amplify the modulated RF signal to a desired power level, and drive the output of the transmitter 100 (e.g., drive an antenna that is coupled to an output of the transmitter 100, or drive a sensor device that is coupled to the output of the transmitter 100). In some embodiments, the amplifier driver stage 150 comprises a programmable gain, wherein gain can be expressed as a difference between the input power level (at the input to the amplifier driver stage 150) and the output power level (at the output of the amplifier driver stage 150) or, more specifically, as a ratio of output to input power. The amplifier driver stage 150 is utilized to increase the power level of the RF output signal to a level which is sufficient to transmit (wirelessly, or wired) the modulated RF signal at given power level and over a required transmission distance.

The impedance matching network 160 is configured to match a source impedance or load impedance of the output of the amplifier driver stage 150 to a characteristic impedance of an output load (e.g., antenna input, diplexer, etc.) of the transmitter 100. In some embodiments, the impedance matching network 160 comprises a balun to convert a differential/balance output of the amplifier driver stage 150 to a single/unbalance output. In some embodiments, the output of the impedance matching network 160 is coupled to an antenna system. In other embodiments, the output of the impedance matching network 160 is coupled to a sensor device. In some embodiments, the resonance parameters (e.g., impedance and bandwidth) of the matching network 160 remain substantially invariant, wherein the matching network 160 is designed with a center frequency which corresponds to the RF transmission frequency of the transmitter 100 (e.g., 2.4 GHz).

In other embodiments, the matching network 160 is configured with a plurality of injection points to provide different impedance matching and filtering characteristics. The different injection points can be selected by digital control signals applied to the matching network 160. The matching network 160 can have high pass and low pass characteristics, wherein the different injection points can be selected to provide different impedance matching and response characteristics. In some embodiments, the impedance matching network 160 is designed with a high-Q factor, wherein the center frequency of the impedance matching network 160 can be adjusted to provide sufficient impedance matching for different transmission frequencies which are generated by, e.g., changing the sampling frequency of the DAC stage 120 and/or changing the LO frequency of modulation stage 140, depending on the given application.

FIG. 2A schematically illustrates a DAC circuit and filter circuit according to an exemplary embodiment of the disclosure. In particular, FIG. 2A schematically illustrates a block of circuitry 200 comprising a DAC circuit 220 and a filter circuit 230, which can be implemented in the DAC stage 120 and the filter stage 130, respectively, of the transmitter 100 of FIG. 1 to generate analog voltage signals which comprise voltage levels (e.g., average voltage level, peak voltage level, etc.) which are less than a negative supply voltage (e.g., negative supply rail), according to an exemplary embodiment of the disclosure. As shown in FIG. 2A, the DAC circuit 220 comprises a digital logic interface and timing control block 222, and a voltage-mode output stage 224. The voltage-mode output stage 224 comprises a plurality of output stages coupled in parallel to an output node N1 of the DAC circuit 220, and an output capacitor $C_{10}$ (or scaling capacitor) coupled between the output node N1 and a negative supply voltage (e.g., VSS voltage rail). In particular, the voltage-mode output stage 224 comprises a plurality (n) of output stages, wherein each output stage comprises a respective inverter 224-0, 224-1, 224-2, ..., 224-(n−1), and corresponding capacitor $C_0$, $C_1$, $C_2$, ..., $C_{n-1}$. The capacitors $C_0$, $C_1$, $C_2$, ..., $C_{n-1}$ are commonly connected to the output node N1. In the embodiment of FIG. 2A, the DAC circuit 220 utilizes the inverters 224-0, 224-1, 224-2, ..., 224-(n−1) as drivers for low power operation.

The digital logic interface and timing control block 222 comprises control circuitry and logic elements to process an input digital baseband signal and output n-bit data signals ($D_0$, $D_1$, $D_2$, ..., $D_{n-1}$) at a given sampling rate of the DAC circuit 220. The data bits of a given n-bit data signal ($D_0$, $D_1$, $D_2$, ..., $D_{n-1}$) are input to the respective inverters 224-0, 224-1, 224-2, ..., 224-(n−1), wherein the inverters generate output voltages to charge/discharge voltages on the corresponding capacitors $C_0$, $C_1$, $C_2$, ..., $C_{n-1}$. In this exemplary embodiment, at any given time, the voltage on the output node N1 comprises a sum of voltages on the capacitors $C_0$, $C_1$, $C_2$, ..., $C_{n-1}$, wherein the voltages on the capacitors $C_0$, $C_1$, $C_2$, ..., $C_{n-1}$ at any given time charge/discharge the output capacitor $C_{10}$ to generate an analog voltage waveform at the output node N1 over time. In particular, for an n-bit data signal ($D_0$, $D_1$, $D_2$, ..., $D_{n-1}$), at any given time, one of $2^n$ different sets of inverters 224-0, 224-1, 224-2, ..., 224-(n−1) are enabled (e.g., with a positive input data pulse) to produce an output voltage on node N1 which represents the n-bit data signal that is applied at the given time to the inputs of the inverters 224-0, 224-1, 224-2, ..., 224-(n−1).

Figure 2B:
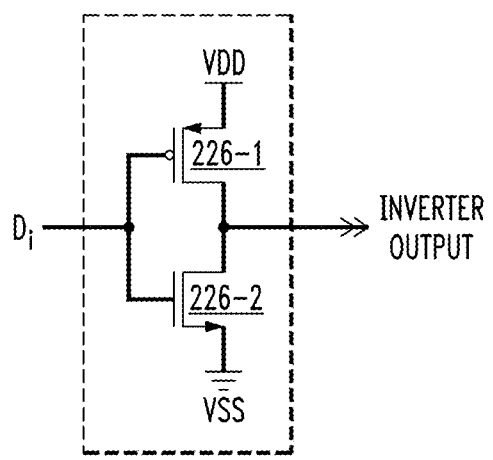
FIG. 2B schematically illustrates an inverter circuit which is implemented in the DAC circuit of FIG. 2A, according to an exemplary embodiment of the disclosure.

In some embodiments, the inverters 224-0, 224-1, 224-2, ..., 224-(n−1) are implemented using CMOS inverter circuits. For example, FIG. 2B schematically illustrates a CMOS inverter circuit 224-$i$ which is implemented in the DAC circuit 220 of FIG. 2A, according to an exemplary embodiment of the disclosure. The CMOS inverter circuit 224-$i$ comprises a PMOS transistor 226-1 and an NMOS transistor 226-2 serially connected between a positive supply voltage node (e.g., VDD supply voltage rail) and a negative supply voltage node (e.g., VSS supply voltage rail). A source terminal of the PMOS transistor 226-1 is connected to the VDD supply voltage rail, and a source terminal of the NMOS transistor 226-2 is connected to the VSS supply voltage rail. In some embodiments, VDD=350 mV and VSS=0V. The transistors 226-1 and 226-2 have commonly connected gate terminals which receive an input data bit Di. The transistors 226-1 and 226-2 have commonly connected drain terminals which are connected to an output node of the inverter circuit 224-$i$.

The operation of the inverter circuit 224-$i$ is well-known. When the input data bit Di has a logic "1" level, the NMOS transistor 226-2 is in an on-state, while the PMOS transistor 226-1 is in an off-state. In this instance, the inverter output voltage is pulled to VSS, which is the low state. When the input data bit Di has a logic "0" level, the complementary situation occurs where the PMOS transistor 226-1 is turned on, and the NMOS transistor 226-2 is turned off. In this state, the inverter output voltage is pulled up to VDD, which is the high-state.

As noted above, at any given time, the voltage on the output node N1 comprises a sum of voltages on the capacitors $C_0$, $C_1$, $C_2$, ..., $C_{n-1}$. In some embodiments, the capacitors $C_0$, $C_1$, $C_2$, ..., $C_{n-1}$ comprise binary-weighed capacitance values. In other embodiments, the capacitors $C_0$, $C_1$, $C_2$, ..., $C_{n-1}$ comprise unary-weighed capacitance values. In some embodiments, the binary-weighed capacitance values are utilized when the DAC circuit 220 implements a relatively small number of bits so as to provide a sufficient range of output voltages. In some embodiments, the unary-weighed capacitance values are utilized when the DAC circuit 220 implements a relatively large number of bits wherein the unary-weighed capacitance values provide finer resolution and greater linearity in the voltage output levels of the DAC circuit 220.

It is to be appreciated that the DAC circuit 220 provides an exemplary architecture in which the DAC output voltage on the output node N1 of the DAC circuit 220 can have a voltage level (e.g., an average voltage level, a peak voltage level, etc.) which is less than the negative supply voltage VSS. An exemplary output voltage waveform which can be generated at the output node N1 of the DAC circuit 220 will be discussed in further detail below in conjunction with FIG. 4A. In this regard, the DAC circuit 220 provides an exemplary architecture to extend a useful dynamic range of the DAC circuit 220 wherein the analog voltage waveform output from the DAC circuit 220 can swing below VSS and, thus, the extend the dynamic range of a transmitter which implements the DAC circuit 220.

As further shown in FIG. 2A, the filter circuit 230 comprises an input that is directly coupled to the output node N1 of the DAC circuit 220. The filter circuit 230 is configured to filter the analog baseband voltage signal which is generated on the output node N1 of the DAC circuit 220, and to generate a filtered analog baseband voltage signal on an output node N3 of the filter circuit 230, wherein the filtered analog baseband voltage signal comprises a voltage level (e.g., an average voltage level, a peak voltage level, etc.) which is less than the negative supply voltage VSS. In the exemplary embodiment of FIG. 2A, the input of the filter circuit 230 is directly coupled (e.g., direct DC-coupling) to the output node N1 of the DAC circuit 220. The filter circuit 230 is configured to filter the analog voltage waveform which is output of the DAC circuit 220 without the need for DC level-shifting the analog voltage waveform at the input of the filter circuit 230.

The filter circuit 230 comprises a biasing circuit 231 which is configured to generate a bias current $I_{BIAS}$ for operating the filter circuit 230 at a given operating point. The biasing circuit 231 comprises a current mirror circuit comprising PMOS transistors 232 and 233 and a current source 234. The current source 234 generates a constant reference current $I_{REF}$ which flows through the PMOS transistor 232, which causes the PMOS transistor 232 to generate a bias current $I_{BIAS}$ which is proportional (e.g., 1:1 ratio, or greater) to the reference current $I_{REF}$. The operation of the current mirror circuit 231 is well known and, thus, a detailed description thereof is not needed to understand the exemplary embodiments described herein.

The filter circuit 230 comprises an analog biquadratic low-pass filter framework which comprises a transistor 235 (e.g., PMOS transistor), a first resistor R1, a second resistor R2, a first capacitor $C_{11}$, and a second capacitor $C_{12}$. The transistor 235 comprises a gate terminal, a first source/drain terminal, and a second source/drain terminal. In particular, in an exemplary embodiment in which the transistor 235 comprises a PMOS transistor, the first source/drain terminal comprises a source terminal which is coupled to a feedback path of the filter circuit 230, and the second source/drain terminal comprises a drain terminal which is coupled to the negative supply voltage node VSS. The gate terminal of the transistor 235 is coupled to the output node N3 of the filter circuit 230.

As further shown in FIG. 2A, the first resistor R1 is coupled between the output node N1 of the DAC circuit 220, and a feedback node N2 of the filter circuit 230. The second resistor R2 is coupled between the feedback node N2, and the output node N3 of the filter circuit 230. The first capacitor $C_{11}$ coupled in the feedback path between the feedback node N2 and the first source/drain terminal of the transistor 235. The second capacitor $C_{12}$ is coupled between the output node N3 of the filter circuit 230 and the negative supply voltage node VSS. The first source/drain terminal (e.g., source terminal) of the transistor 235 is coupled to the output of the biasing circuit 231 such that the bias current $I_{BIAS}$ flows in a channel of the transistor 235 to set the operating point of the filter circuit 230.

It is to be appreciated that the filter circuit 230 of FIG. 2A provides a novel design of a low-pass 2nd order Sallen-Key filter (or positive feedback filter) which is implemented using a single transistor 235, instead of an operational amplifier as is typically implemented in conventional Sallen-Key filter and biquadratic low-pass filter designs. In this regard, as compared to conventional biquadratic low-pass filter circuits, the implementation of the single-transistor biquadratic low-pass filter circuit 230 in FIG. 2A provides lower power consumption and a smaller footprint (less occupied area). In the filter circuit 230 of FIG. 2A, the filter feedback loop is implemented by connecting the first source/drain terminal (e.g., source terminal) of the transistor 235 to the feedback node N2 through the first capacitor $C_{11}$.

The exemplary design of the filter circuit 230 in FIG. 2A allows direct DC-coupling between the output node N1 of the DAC circuit 220 and the input node of the filter circuit 230, whereby the analog voltage waveform at the input node of the filter circuit 230 can swing below the negative supply rail VSS, despite the filter circuit 230 being DC-biased between the positive VDD and negative VSS supply rails. Moreover, the output node N3 of the filter circuit 230 comprises a high impedance node. With this filter configuration, the output node N3 of the filter circuit 230 can be provided to an antenna or sensor device, or upconverted by the modulation stage 140, and then provided to an antenna or sensor device.

It is to be understood that the exemplary DAC circuit 220 and the filter circuit 230 as shown in FIG. 2A can be used to implement the first DAC circuit 121 and the first filter circuit 131 in the DAC and filter stages 120 and 130 of the transmitter 100 of FIG. 1, to thereby convert a digital in-phase (I) baseband signal into an in-phase analog baseband signal I(t) and low-pass filter the in-phase analog baseband signal I(t). Similarly, the exemplary DAC circuit 220 and the filter circuit 230 as shown in FIG. 2A can be used to implement the second DAC circuit 122 and the second filter circuit 132 in the DAC and filter stages 120 and 130 of the transmitter 100 of FIG. 1, to thereby convert a digital quadrature-phase (Q) baseband signal into a quadrature-phase analog baseband signal Q(t) and low-pass filter the quadrature-phase analog baseband signal Q(t). In this regard, for a single-ended DAC and filter configuration, the DAC stage 120 and the filter stage 130 of the transmitter 100 would be implemented with two of the DAC circuits 220 and two of the filter circuits 230, one DAC circuit 220 and one filter circuit 230 for each I and Q baseband channel.

On the other hand, for a differential DAC and filter configuration, the first DAC circuit 121 can be implemented with two of the DAC circuits 220 shown in FIG. 2A, wherein one DAC circuit 220 is configured to generate an in-phase analog baseband signal I(t), and the other DAC circuit 220 is configured to generate a complementary in-phase analog baseband signal $\overline{I(t)}$, which is essentially an inverted version of the in-phase analog baseband signal I(t). Similarly, for the differential DAC and filter configuration, the second DAC circuit 122 can be implemented with two of the DAC circuits 220 shown in FIG. 2A, wherein one DAC circuit 220 is configured to generate a quadrature-phase analog baseband signal Q(t), and the other DAC circuit 220 is configured to generate a complementary quadrature-phase analog baseband signal $\overline{Q(t)}$, which is essentially an inverted version of the quadrature-phase analog baseband signal Q(t).

Similarly, for the differential DAC and filter configuration, the first filter circuit 131 of the filter stage 130 of the transmitter 100 can be implemented with two of the filter circuits 230 shown in FIG. 2A, wherein one filter circuit 230 is configured to filter the in-phase analog baseband signal I(t), and the other filter circuit 230 is configured to filter the complementary in-phase analog baseband signal $\overline{I(t)}$. Furthermore, for the differential DAC and filter configuration, the second filter circuit 132 of the filter stage 130 of the transmitter 100 can be implemented with two of the filter circuits 230 shown in FIG. 2A, wherein one filter circuit 230 is configured to filter the quadrature-phase analog baseband signal Q(t), and the other filter circuit 230 is configured to filter the complementary quadrature-phase analog baseband signal $\overline{Q(t)}$.

Figure 3:
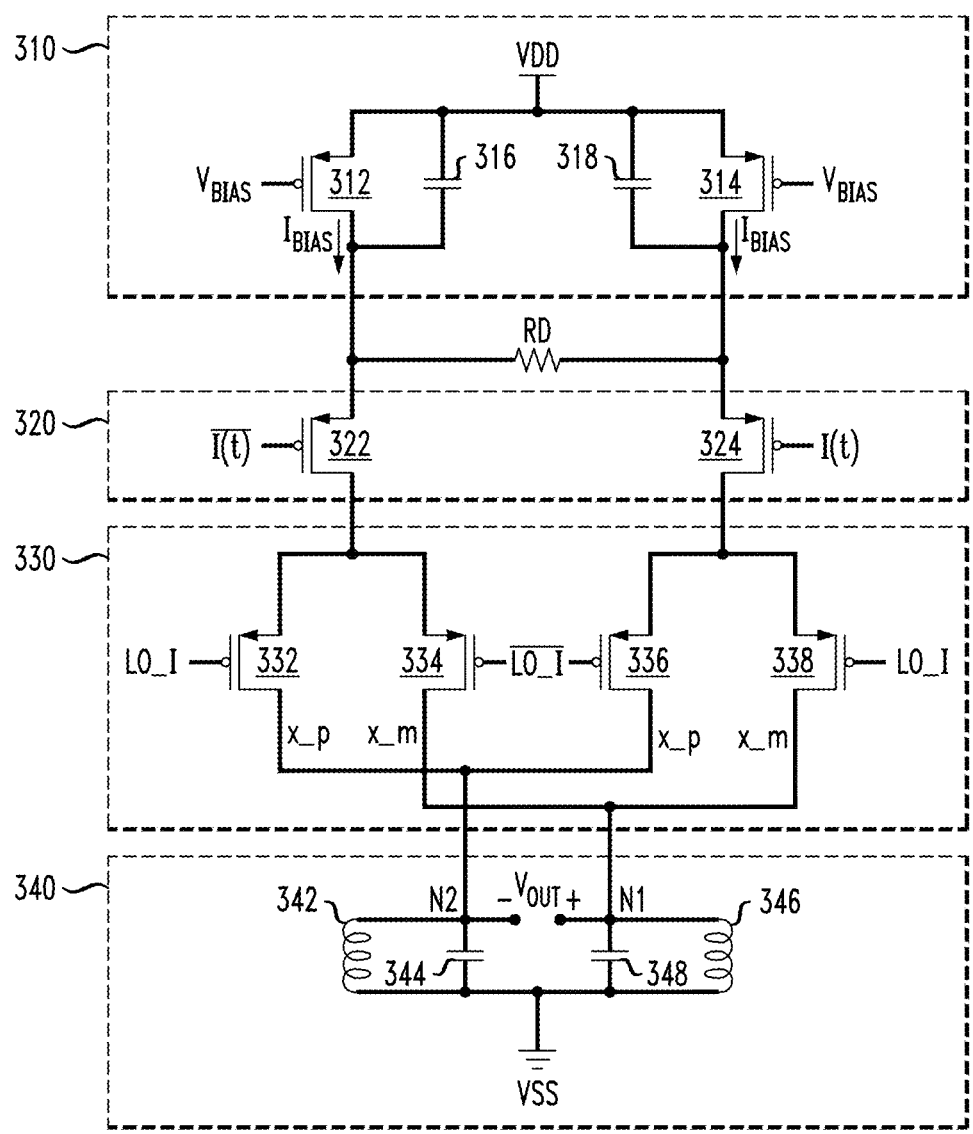
FIG. 3 schematically illustrates a modulation circuit, according to an exemplary embodiment of the disclosure.

FIG. 3 schematically illustrates a modulation circuit, according to an exemplary embodiment of the disclosure. In some embodiments, FIG. 3 schematically illustrates a modulation circuit 300 which can be implemented in the modulation stage 140 of the transmitter 100 of FIG. 1. In particular, FIG. 3 schematically illustrates an exemplary SSB modulation circuit 300 which comprises a double-balanced Gilbert mixer cell configuration, according to an exemplary embodiment of the disclosure. FIG. 3 illustrates an exemplary embodiment of a SSB modulation circuit 300 which is configured to generate an output voltage waveform $V_{OUT}$ which comprises an average voltage of about 0V and which comprises a peak voltage which is less than the negative power supply node VSS. It is to be understood that for ease of illustration, FIG. 3 schematically illustrates an exemplary SSB double-balanced mixer circuit configuration in which the first mixer circuit 141 (I-mixer) is shown for a differential DAC and filter configuration, while the second mixer circuit 142 (Q-mixer) is not shown in FIG. 3. In this regard, FIG. 3 shows an exemplary embodiment of the SSB modulation circuit 300 in which a complementary pair of in-phase analog baseband signals I(t) and $\overline{I(t)}$ and a complementary pair of in-phase LO signals LO_I and $\overline{LO\_I}$ are input to modulation circuit 300.

The modulation circuit 300 comprises a DC biasing stage 310, a degeneration resistor RD, a baseband signal input and processing stage 320, mixer stage 330, and a signal output stage 340 (e.g., signal combiner circuit). The DC biasing stage 310 comprises PMOS transistors 312 and 314 and degeneration capacitors 316 and 318. The PMOS transistor 312 and degeneration capacitor 316 are connected in parallel, and the PMOS transistor 314 and the degeneration capacitor 318 are connected in parallel. The PMOS transistors 312 and 314 comprise gate terminals which receive a DC bias voltage $V_{BIAS}$ to generate quiescent DC bias currents $I_{BIAS}$ for the respective branches of the modulation circuit 300. In some embodiments, a DC bias voltage $V_{BIAS}$ equal to zero volts ($V_{BIAS}$=0V) is applied to the gate terminals of the transistors 312 and 314. The degeneration resistor RD is connected across the biasing branches of the modulation circuit 300 and is configured to improve linear operation of the modulation circuit 300, as is understood by those of ordinary skill in the art.

The output of the DC biasing stage 310 is coupled to the baseband signal input and processing stage 320. The baseband signal input and processing stage 320 comprises PMOS transistors 322 and 324. In some embodiments, the PMOS transistors 322 and 324 comprise gate terminals that are coupled to the output nodes of a complementary pair of filter circuits. For example, for a differential configuration of the DAC and filter circuits 220 and 230 shown in FIG. 2A, the gate terminal of the PMOS transistor 322 would be directly coupled to the output node N3 of the filter circuit 230 which generates the filtered complementary in-phase analog baseband signal $\overline{I(t)}$, while the gate terminal of the PMOS transistor 324 would be directly coupled to the output node N3 of the filter circuit 230 which generates the filtered in-phase analog baseband signal I(t).

The output of the baseband signal input and processing stage 320 is coupled to an input of the mixer stage 330. The mixer stage 330 comprises switching PMOS transistors 332, 334, 336, and 338. The switching transistors 332 and 334 have commonly connected source terminals which provide a first input to the mixer stage 330, which is connected to a first output (e.g., drain terminal of the transistor 322) of the baseband signal input and processing stage 320. Similarly, the switching transistors 336 and 338 have commonly connected source terminals which provide a second input to the mixer stage 330, which is connected to a second output (e.g., a drain terminal of the transistor 324) of the baseband signal input and processing stage 320.

As further shown in FIG. 3, an in-phase local oscillator signal LO_I is applied to gate terminals of the switching transistors 332 and 338, while a complementary in-phase local oscillator signal $\overline{LO\_I}$ is applied to gate terminals of the switching transistors 334 and 336. Moreover, the switching transistors 334 and 338 comprise commonly connected drain terminals which provide a first output of the mixer stage 330 that is connected to a first node N1 of the signal output stage 340. Similarly, the switching transistors 332 and 336 comprise commonly connected drain terminals which provide a second output of the mixer stage 330 that is connected to a second node N2 of the signal output stage 340.

The signal output stage 340 comprises inductors 342 and 346, and capacitors 344 and 348. The inductor 346 and the capacitor 348 are connected in parallel between the first node N1 and the negative supply voltage node VSS. The inductor 342 and the capacitor 344 are connected in parallel between the second node N2 and the negative supply voltage node VSS. The signal output stage 340 generates an output voltage VOUT, e.g., differential output voltage $V_{OUT}^+$ and $V_{OUT}^-$ on the nodes N1 and N2. The signal output stage 340 comprises an exemplary embodiment of the signal combiner circuit 143 of the modulation stage 140, FIG. 1.

During operation where the complementary pair of in-phase analog baseband signals I(t) and $\overline{I(t)}$ are applied to the inputs of the baseband signal input and processing stage 320, and the complementary pair of in-phase LO signals LO_I and $\overline{LO\_I}$ are applied to the inputs of the mixer stage 330, the switching transistors 334 and 338 of the mixer stage 330 generate output currents x_m which are applied to the first node N1 to excite the LC circuit 346 and 348 and thereby generate a voltage $V_{OUT}^+$ on the first node N1. Similarly, the switching transistors 332 and 336 of the mixer stage 330 generate output currents x_p which are applied to the second node N2 to excite the LC circuit 342 and 344 and thereby generate a voltage $V_{OUT}^-$ on the second node N2.

As noted above, the modulation circuit 300 comprises a second Giber mixer cell (e.g., Q-mixer cell, not shown) which comprises a duplicate of the DC biasing stage 310, the degeneration resistor RD, the baseband signal input and processing stage 320, and the mixer stage 330 for processing and mixing a quadrature-phase analog baseband signal Q(t) and a quadrature-phase local oscillator signal LO_Q. In particular, the baseband signal input and processing stage 320 for the Q mixing cell would receive as input a complementary pair of quadrature-phase analog baseband signals Q(t) and $\overline{Q(t)}$, and the Q mixer stage would receive as input a complementary pair of quadrature-phase LO signals LO_Q and $\overline{LO\_Q}$. The two outputs of the Q mixer stage would be coupled to the nodes N1 and N2 of the signal output stage 340 shown in FIG. 3, such that the output current signals x_m of the I and Q mixer cells would be collectively combined at the first node N1, while the output current signals x_p of the I and Q mixer cells would be collectively combined at the second node N2.

In other embodiments, the transmitter 100 of FIG. 1 can be configured to generate an RF output signal with a transmission frequency at a baseband frequency. In this instance, the modulation stage 140 (or the modulation circuit 300) can be configured to operate with an LO frequency signal (e.g., LO_I) which is held at a logic "0" level (i.e., LO_I=0V), while disabling the Q-mixer cell, to thereby enable the differential filtered analog baseband signals I(t) and $\overline{I(t)}$ to pass through the modulation stage 140 to the amplifier driver stage 150 without being upconverted to a higher frequency. In this configuration, the complementary pair of filtered analog baseband signals I(t) and $\overline{I(t)}$ are input to the first mixer circuit 141 of the modulation stage 140 (FIG. 1) or the modulation circuit 300 (FIG. 3) will not be upconverted to a higher center frequency by operation of the mixer circuitry.

In other words, to enable a baseband operation mode of the transmitter 100, the DAC stage 120, the filter stage 130 and the modulation stage 140 of the transmitter 100 of FIG. 1 would be configured to bypass the up conversion operation of the modulation stage 140 (e.g., the modulation circuit 300 in FIG. 3) by applying a static LO_I signal of 0V to the LO inputs of the first mixer circuit 141 which, in the exemplary embodiment of FIG. 3, would keep the switching transistors 332 and 338 in an on-state, and keep the switching transistors 334 and 336 in an off-state, and thereby essentially allow the complementary filtered analog baseband signals I(t) and $\overline{I(t)}$ to be output at the nodes N1 and N2 of the output stage 340. Moreover, for baseband operation, the Q-processing circuit blocks (e.g., second DAC circuit 122, second filter circuit 132, and second mixer circuit 142) of the signal processing stages 120, 130, and 140 could be powered-down to conserve power.

It is to be appreciated that the signal processing stages of the DAC circuit 220, the filter circuit 230, and the modulation circuit 300 as shown in FIGS. 2A and 3 collectively operate to generate analog AC voltage signals with voltage levels that swing below the negative power supply rail VSS. In this regard, while the DAC circuit 220, the filter circuit 230, and the modulation circuit 300 operate with static DC biasing that is limited by the positive and negative supply rails, the circuit configurations of the DAC circuit 220, the filter circuit 230, and the modulation circuit 300 as shown in FIGS. 2A and 3 essentially allow for an extension of the dynamic range of the DAC, filter, and modulation signal processing stages below the VSS supply rail, to thereby provide for ultra-lower power operation of a transmitter which implements such signal processing stages.

Figure 4A:
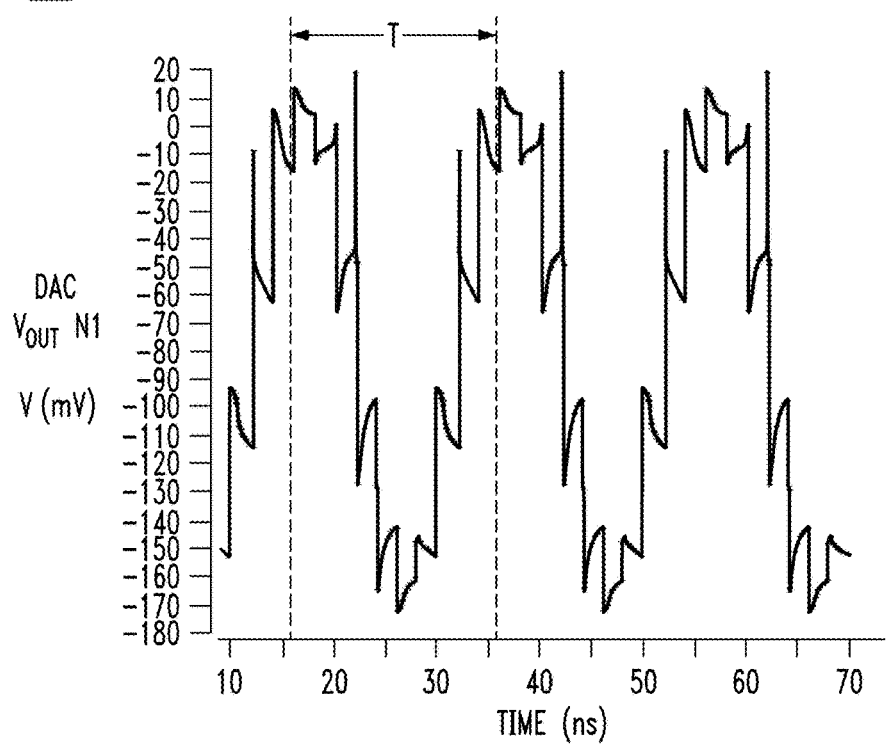
FIG. 4A illustrates a voltage waveform which is generated by a DAC circuit, according to an exemplary embodiment of the disclosure.

For example, FIG. 4A illustrates a voltage waveform 400 which can be generated by the DAC circuit 220 of FIG. 2A, according to an exemplary embodiment of the disclosure. In particular, FIG. 4A illustrates a simulated voltage waveform 400 which can be generated by the DAC circuit 220 on the output node N1 thereof, and directly applied to the input node of the filter circuit 230. The voltage waveform 400 comprises a plurality of incremental voltage step transitions which form the analog voltage output signal 400 over time (as illustrated in nanoseconds (ns)). In the exemplary embodiment shown in FIG. 4A, the voltage waveform 400 comprises a period T of about 20 ns, with a voltage level that swings from about +20 mV to about −170 mV wherein it is assumed that the positive supply voltage rail VDD is 350 mV, and the negative supply voltage rail VSS is 0V. FIG. 4A shows that most of the DAC output voltage waveform 400 has a voltage level which is less than VSS. In addition, FIG. 4A illustrates that the output voltage waveform 400 comprises an average voltage level which is about −80 mV. With a positive supply voltage rail of 350 mV, it can be seen that the output voltage of the DAC circuit 220 can have an effective rail-to-rail voltage swing of 350 mV−(−170 mV)=520 mV, which is significantly greater than the actual rail-to-rail voltage difference of VDD−VSS=350 mV.

In other words, despite the output of the inverters 224-0, 224-1, 224-2, . . . , 224-(n−1) of the DAC circuit 220 having a rail-to-rail voltage swing that is limited to VDD−VSS=350 mV, the implementation of the inverters 224-0, 224-1, 224-2, . . . , 224-(n−1) to drive the output capacitors $C_0$, $C_1$, $C_2$, . . . , $C_{n-1}$ in a configuration in which the output node N1 of the DAC circuit 220 comprises an isolated capacitance node, which is isolated from the supply node (e.g., VDD node), allows the voltage on the scaling capacitor $C_{10}$ at the output node of the DAC circuit 220 to swing below the VSS power supply rail.

Figure 4B:
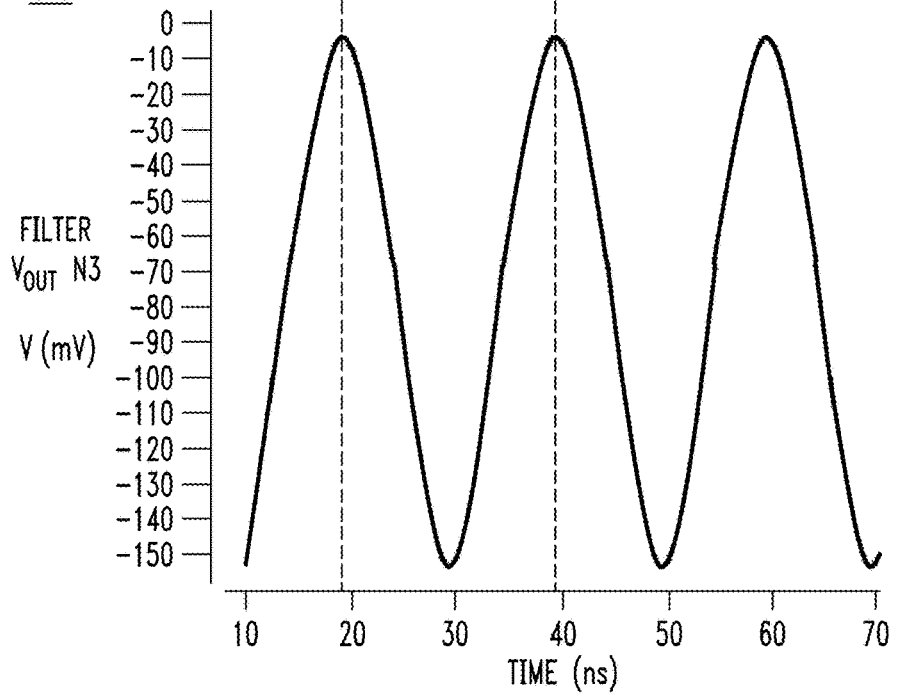
FIG. 4B schematically illustrates a filtered voltage waveform which is generated by a filter circuit, according to an exemplary embodiment of the disclosure.

Furthermore, as noted above, filter circuit 230 is configured for direct DC coupling to the output node N1 of the DAC circuit 220, without the need for DC level-shifting at the input of the filter circuit 230 as the filter circuit 230 is configured to receive and filter a DAC output voltage waveform with voltage levels that are below the negative supply voltage rail VSS. For example, FIG. 4B schematically illustrates a filtered voltage waveform which is generated by a filter circuit, according to an exemplary embodiment of the disclosure. In particular, FIG. 4B illustrates a simulated voltage waveform 410 which represents a filtered voltage waveform that is generated by operation of the filter circuit 230 to low-pass filter the DAC output voltage waveform 400 of FIG. 4A.

As shown in FIG. 4B, the filtered voltage waveform 410 comprises a smoothened sinusoidal waveform having the same period T (e.g., about 20 ns) as the DAC output voltage waveform 400, but where the entire filtered voltage waveform 410 is below the negative supply voltage rail VSS. FIG. 4B illustrates an exemplary filtered voltage waveform 410 which is output from the output node N3 of the filter circuit 230 and directly applied (directly coupled) to the baseband signal input and processing stage 320 of the modulation circuit 300 of FIG. 3. In this regard, the modulation circuit 300 of FIG. 3 is configured to receive the filtered voltage waveform 410 which is output from the filter circuit 230 without having to apply DC level-shifting between the output node N3 of the filter circuit 230 and the input of the baseband signal input and processing stage 320.

In other words, the modulation circuit 300 comprises a circuit configuration which allows direct-coupling to the output node of the filter circuit 230 to input and process a filtered voltage waveform which is output from the filter circuit 230, wherein the filtered voltage waveform has a voltage level (e.g., a peak voltage level, an average voltage level, etc.) which is below the negative supply voltage rail VSS. The modulation circuit 300 utilizes a stack of PMOS transistors, with low bias voltages (e.g., $V_{BIAS}$=0V), and a signal output stage 340 in which the first and second nodes N1 and N2 are inductively loaded via the inductors 342 and 346 and coupled to the negative supply voltage rail VSS through the inductors 342 and 346. This circuit configuration allows the mixer stage 330 to mix the low voltage (filtered) analog baseband voltage waveforms, which are directly applied to the inputs of baseband signal input and processing stage 320, with the local oscillator signals that are input to the mixer stage 330, while allowing the output voltage $V_{OUT}$ on the first and second nodes N1 and N2 of the signal output stage 340 to swing below the negative supply voltage rail VSS. In some embodiments, the output voltage $V_{OUT}$ on the nodes N1 and N2 of the signal output stage 340 will have an average voltage of about 0V, and a peak voltage which swings below the negative supply voltage rail VSS.

While FIGS. 2A, 2B, and 3 illustrate exemplary embodiments in which the signal processing stages of a transmitter are configured to generate dynamic voltage signal waveforms which have voltage levels (e.g., a peak voltage level, an average voltage level, etc.) that are less than the negative supply voltage rail VSS, in other embodiments, the signal processing stages of a transmitter can be configured to generate dynamic voltage signal waveforms which have voltage levels (e.g., a peak voltage level, an average voltage level, etc.) that are greater than the positive supply voltage rail VDD. For example, FIG. 5 schematically illustrates a block of circuitry 500 which comprises a DAC circuit 520 and a filter circuit 530, which can be implemented in the DAC stage 120 and the filter stage 130 of the transmitter 100 of FIG. 1, according to another exemplary embodiment of the disclosure, to effectively extend the dynamic range of the signal processing stages above the VDD supply rail.

In particular, FIG. 5 illustrates a voltage-mode DAC circuit 520 which comprises an architecture that is similar to the voltage-mode DAC circuit 220 of FIG. 2A, but where the DAC circuit 520 comprises a voltage-mode output stage 524 which is configured to generate an analog output voltage on an output node N1 of the DAC circuit 520 which has voltage levels that exceed the positive supply voltage rail VDD. In particular, as shown in FIG. 5, a voltage-mode output stage 524 comprises an inductor $L_{10}$ which is coupled between the output node N1 and the VDD supply voltage rail. In this exemplary embodiment, the output node N1 comprises a node between the inductor $L_{10}$ and the scaling capacitor $C_{10}$. In this configuration, since the output node N1 is inductively coupled to the positive supply voltage node VDD, the output voltage generated on the output (scaling) capacitor $C_{10}$ can rise to a voltage level which is greater than the positive supply voltage VDD.

As further shown in FIG. 5, the filter circuit 530 comprises an input that is directly coupled to the output node N1 of the DAC circuit 520. The filter circuit 530 has a circuit configuration which is similar to the filter circuit 230 of FIG. 2A, but where the filter circuit 530 is configured to filter the analog baseband voltage signal, which is output on the output node N1 of the DAC circuit 520 and which comprises a voltage level (e.g., an average voltage level, a peak voltage level, etc.) that is greater than the positive supply voltage VDD, to thereby generate a filtered analog baseband voltage signal on an output node N3 of the filter circuit 530, which comprises a voltage level (e.g., an average voltage level, a peak voltage level, etc.) that is greater than the positive supply voltage VDD. In the exemplary embodiment of FIG. 5, the input of the filter circuit 530 is directly coupled (e.g., direct DC-coupling) to the output node N1 of the DAC circuit 520, wherein the filter circuit 530 is configured to filter the analog voltage output of the DAC circuit 520 without the need for DC level-shifting the analog voltage signal at the input of the filter circuit 530.

The filter circuit 530 of FIG. 5 is similar to the filter circuit 230 of FIG. 2A, but comprises an "inverted" circuit configuration which implements NMOS transistors 532, 533, and 535, in place of the PMOS transistors 232, 233, and 235 of the filter circuit 230 of FIG. 2A, and where a current mirror circuit 531 comprises a reference current source 534 coupled to the VDD supply rail. It is to be understood that the low-pass filter circuit 530 of FIG. 5 operates in a manner similar to the low-pass filter circuit 230 of FIG. 2A, except that the filtered voltage waveform that is output on the output node N3 has voltage levels (e.g., a peak voltage level, an average voltage level, etc.) which are greater than the positive supply voltage VDD.

It is to be understood that the modulation circuit 300 of FIG. 3 can be modified to have an "inverted" circuit configuration to allow the output voltage of the output stage 340 to have a peak voltage level which extends above the positive supply voltage rail VDD, and an average voltage level of about 0V. In particular, the modulation circuit 300 can be modified by replacing the PMOS transistors 312, 314, 322, 324, 332, 334, 336, and 338 with NMOS transistors, connecting the DC biasing stage 310 to the VSS supply rail, and connecting the signal output stage 340 to the VDD supply rail. In this inverted circuit configuration of the modulation circuit, the mixer stage 330 would mix the filtered analog baseband voltage waveforms, which are directly applied from the output node N3 of the filter circuit 530 of FIG. 5 to the input of the baseband signal input and processing stage 320, with the local oscillator signals that are input to the mixer stage 330, while allowing the output voltage $V_{OUT}$ on the first and second nodes N1 and N2 of the signal output stage 340 to swing above the positive supply voltage rail VDD. In this configuration, the inductive coupling of the nodes N1 and N2 to the VDD rail through the inductors 342 and 346 would allow the peak voltage level of the output voltage $V_{OUT}$ on the nodes N1 and N2 to swing above the VDD supply rail.

It is to be appreciated that the exemplary embodiments of the DAC, filter, and modulation circuitry as shown, for example, in FIGS. 2A, 3, and 5 allow for increased signal processing at voltage swings which are greater that the VDD and VSS supply rails. In conventional systems, as lower supply voltages (e.g., lower VDD) are utilized, the difference between the positive and negative supply rails decreases, which decreases the dynamic signal processing capabilities of the circuitry. However, as noted above, the exemplary embodiments described herein implement isolated intermediate nodes which allow the output voltages generated by various signal processing stages (e.g., DAC and filter stages) to swing above the VDD rail or below the VSS rail, and thereby allow the signal processing stages to process analog signals with peak-to-peak signal amplitudes which are greater than the rail-to-rail swing that would otherwise be limited by the VDD and VSS supply rails.

Figure 6A:
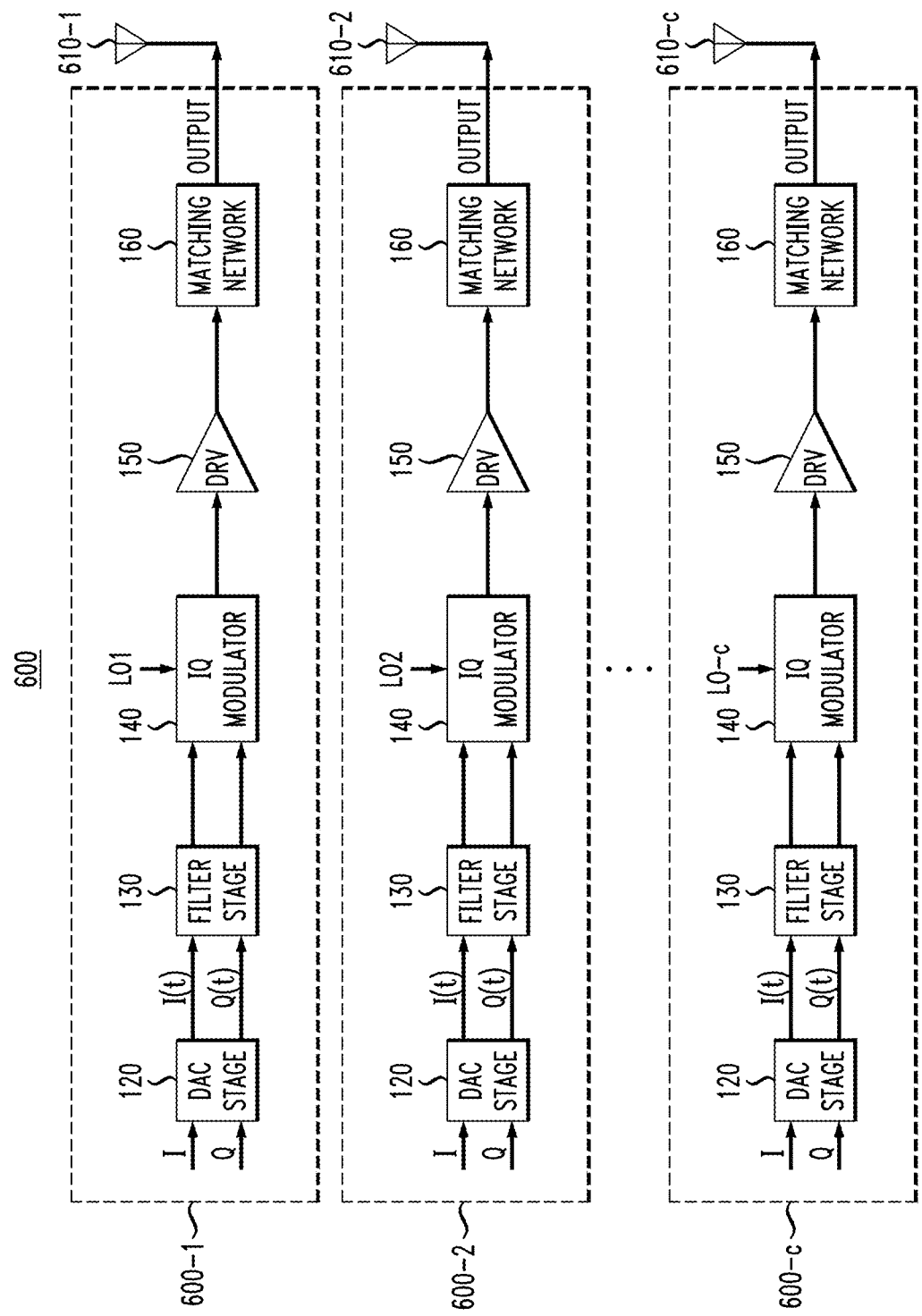
FIG. 6A schematically illustrates a multi-channel transmitter, according to an exemplary embodiment of the disclosure.

FIG. 6A schematically illustrates a multi-channel transmitter, according to an exemplary embodiment of the disclosure. In particular, FIG. 6A schematically illustrates a transmitter 600 comprising a plurality (c) of transmitter channels 600-1, 600-2, . . . , 600-c. The number c of transmitter channels will vary depending on the application. In some embodiments, each transmitter channel 600-1, 600-2, . . . , 600-c comprises a similar circuit configuration. For example, in some embodiments, as shown in FIG. 6A, each transmitter channel 600-1, 600-2, . . . , 600-c comprises the same channel architecture as the single-channel transmitter 100 shown in FIG. 1, and can implement the DAC circuitry, the filter circuitry, and the modulation circuitry as shown in FIGS. 2A, 2B, 3, and/or 5.

FIG. 6A schematically illustrates an exemplary embodiment in which the different transmitter channels 600-1, 600-2, . . . , 600-c are configured to operate at different center frequencies. More specifically, in some embodiments, the modulation stage 140 in the transmitter channel 600-1 is configured to perform IQ modulation using an LO frequency of LO1, while the modulation stages 140 in the transmitter channels 600-2, . . . , 600-c are configured to perform IQ modulation using different LO frequencies LO2, . . . , LO-c, which are greater than LO1. This allows the multi-channel transmitter 600 to simultaneously transmit the information content of the digital IQ baseband signal, which is input to each of transmitter channels 600-1, 600-2, . . . , 600-c, to different nodes which are configured to operate with different receiver center frequencies.

As further shown in FIG. 6A, antennas 610-1, 610-2, . . . , 610-c are coupled to respective outputs of the transmitter channels **600-1, 600-2, . . . , 600-*c*. In some embodiments the antennas 610-1, 610-2, . . . , 610-*c* comprise individual antennas having respective antenna bandwidths which correspond to the RF output signal frequencies of the different transmitter channels 600-1, 600-2, . . . , 600-*c*. In other embodiments, the transmitter channels 600-1, 600-2, . . . , 600-*c* are coupled to a single, wideband antenna element having an antenna bandwidth which is configured to efficiently radiate energy at the RF output signal frequencies of the different transmitter channels 600-1, 600-2, . . . , 600-*c***.

Figure 6B:
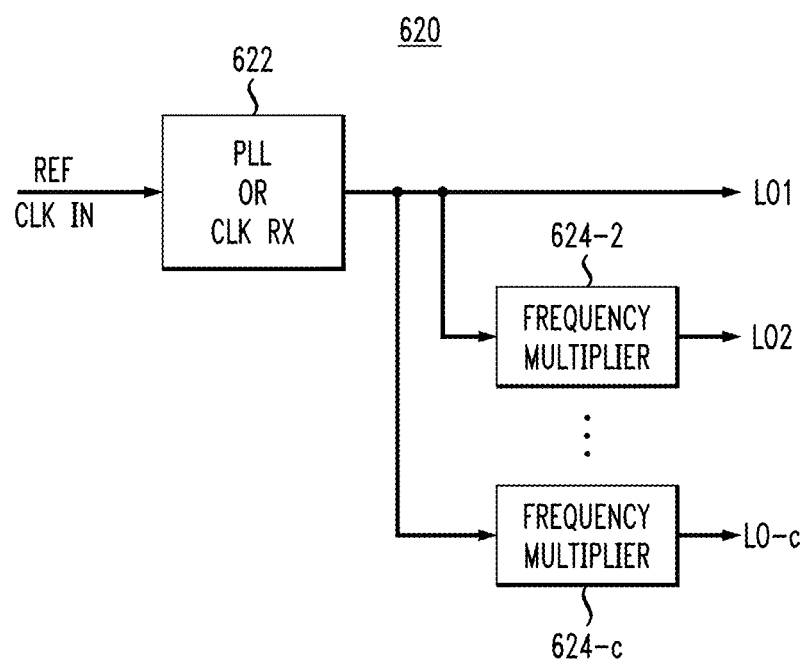
FIG. 6B schematically illustrates a local oscillator (LO) signal generator circuit which can be implemented to generate different LO signals for the multi-channel transmitter of FIG. 6A, according to an exemplary embodiment of the disclosure.

FIG. 6B schematically illustrates a LO signal generator circuit 620 which can be implemented to generate different LO signals for the multi-channel transmitter of FIG. 6A, according to an exemplary embodiment of the disclosure. In some embodiments, the LO signal generator circuit 620 comprises a phase-locked loop (PLL) circuit 622 and a plurality of frequency multiplier circuits **624-2, . . . , 624-*c*, coupled to an output of the PLL circuit 622. The PLL circuit 622 is configured to receive a reference clock signal (REF CLK) as input and generate a first local oscillator signal LO1 which is applied to the LO1 port of the transmitter channel 600-1 of the transmitter 600. The LO1 signal is utilized to generate local quadrature signals LO1_I and LO1_Q for the modulation stage 140 of the transmitter channel 600-1 using a local quadrature phase shifter circuit. As further shown in FIG. 6B, the first local oscillator signal LO1 is input to each of the frequency multiplier circuits 624-2, . . . , 624-*c***, which generate respective LO signals LO2, . . . , LO-*c* that are used by the respective transmitter channels **600-2, . . . , 600-*c* to generate local quadrature signals for the respective modulation stages 140**.

Figure 7:
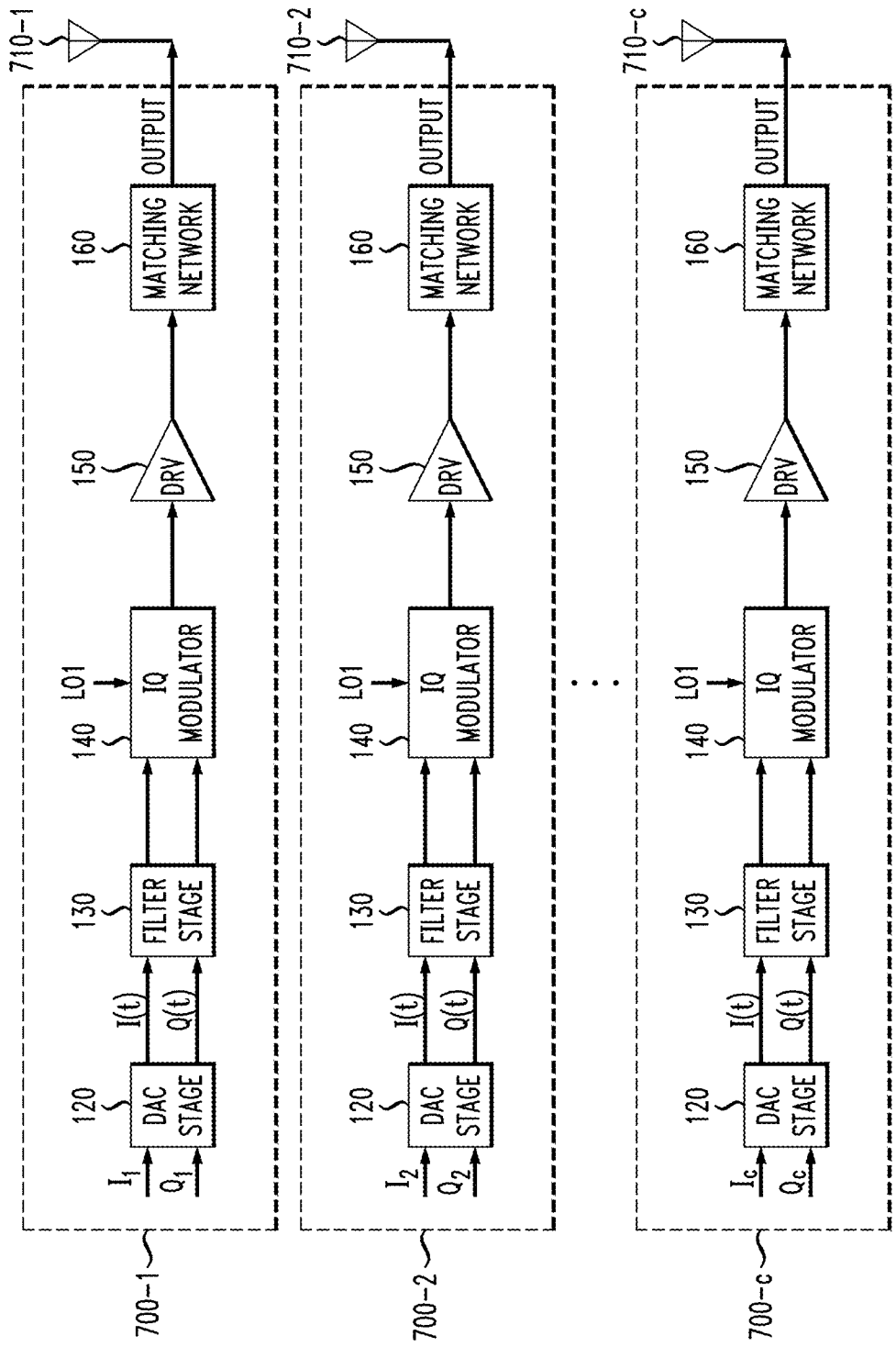
FIG. 7 schematically illustrates a multi-channel transmitter, according to another exemplary embodiment of the disclosure.

FIG. 7 schematically illustrates multi-channel transmitter, according to an exemplary embodiment of the disclosure. In particular, FIG. 7 schematically illustrates a transmitter 700 comprising a plurality (c) of transmitter channels **700-1, 700-2, . . . , 700-*c*. The number c of transmitter channels will vary depending on the application. In some embodiments, each transmitter channel 700-1, 700-2, . . . , 700-*c* comprises a similar transmitter circuit configuration, wherein each transmitter channel 700-1, 700-2, . . . , 700-*c* comprises the same channel architecture as the single-channel transmitter 100 shown in FIG. 1, and can implement the DAC circuitry, the filter circuitry, and the modulation circuitry shown in FIGS. 2A, 2B, 3, and/or 5**.

As further shown in FIG. 7, individual antenna elements **710-1, 710-2, . . . , 710-*c* are coupled to respective outputs of the transmitter channels 700-1, 7002, . . . , 700-*c*. In some embodiments, the antenna elements 710-1, 710-2, . . . , 710-*c* form an antenna array to implement a phased array antenna system in which a radiation pattern of each individual antenna element 710-1, 710-2, . . . , 710-*c* constructively combines with neighboring antennas to form an effective radiation pattern called the main lobe. With a phased array antenna configuration, the main radiation lobe transmits energy in a desired direction (e.g., beam steering) location. On the other hand, the radiation pattern of each individual antenna element 710-1, 710-2, . . . , 710-*c* destructively interferes with each other in undesired directions, forming nulls and side lobes. In this regard, the antenna array is designed to maximize the energy radiated in the main lobe while reducing the energy radiated in the side lobes to an acceptable level. The direction of the main lobe of radiation can be manipulated by changing the phase of the RF output signal that is fed into each individual antenna element 710-1, 700-2, . . . , 710-*c* from the respective outputs of the transmitter channels 700-1, 700-2, . . . , 700-*c***.

In some embodiments, the requisite phase delays of the RF output signals from the transmitter channels **700-1, 700-2, . . . , 700-*c* is achieved in the digital domain by adding a delay to a digital IQ baseband signal that is input to the DAC stages 120 of the transmitter channels 700-1, 700-2, . . . , 700-*c*. For example, as shown in FIG. 7, the transmitter channel 700-1 receives digital baseband signals $I_1$ and $Q_1$, the transmitter channel 700-2 receives digital baseband signals $I_2$ and $Q_2$, and the transmitter channel 700-*c* receives digital baseband signals $I_C$ and $Q_C$, etc. The digital baseband signals $I_1/Q_1$, $I_2/Q_2$ . . . , $I_C/Q_C$ that are received by the respective transmitter channels 700-1, 700-2, . . . , 700-*c* comprise the same IQ baseband signal in terms of information content, but where each transmitter channel 700-1, 700-2, . . . , 700-*c* receives a different delayed version of the digital IQ baseband signal. The phase delay in the digital domain results in the generation of a plurality of corresponding phase-delayed RF output signals by the respective transmitter channels 700-1, 700-2, . . . , 700-*c*, which are output to the antenna array (710-1, 710-2, . . . , 710-*c***) to thereby generate a directional radiation beam which radiates from the antenna array.

Figure 8:
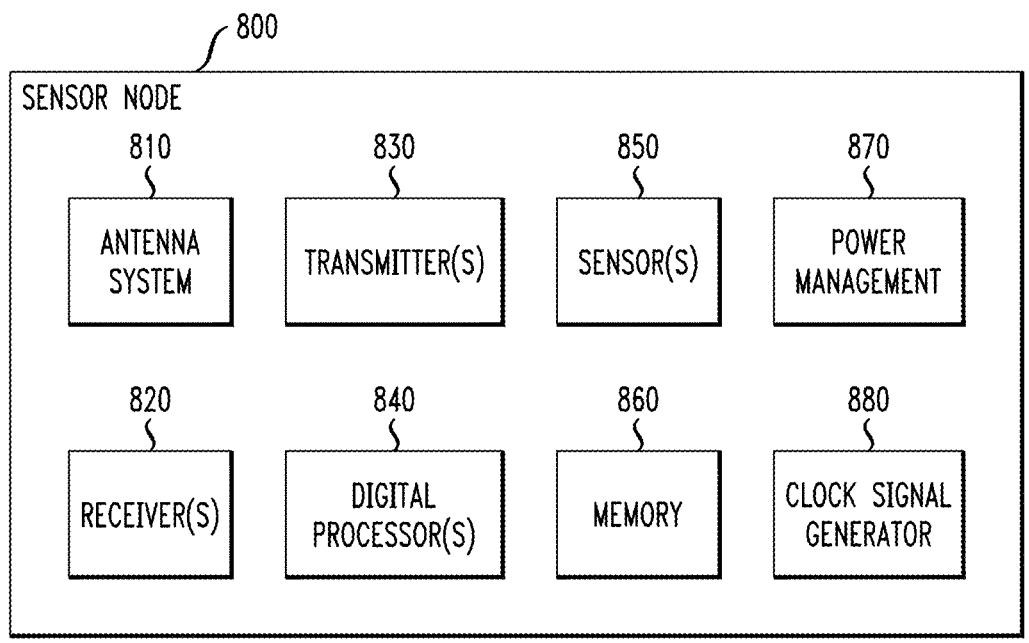
FIG. 8 schematically illustrates a sensor node which implements a transmitter, according to an exemplary embodiment of the disclosure.

FIG. 8 schematically illustrates a sensor node which implements a transmitter, according to an exemplary embodiment of the disclosure. More specifically, FIG. 8 schematically illustrates a sensor node 800 which comprises an antenna system 810, one or more receivers 820 (e.g., single or multi-channel receiver), one or more transmitters 830 (e.g., single or multi-channel transmitter), one or more digital processors 840, one or more sensors 850, memory 860, a power management system 870, and a clock signal generator 880. In some embodiments, the sensor node 800 comprises a node in a sensor network that is configured to collect and process sensor information and communicate with other nodes (e.g., sensor nodes, computing nodes, etc.) in a network.

The antenna system 810 comprises one or more antenna elements, (e.g., wideband antenna, narrow band antenna elements, antenna array, etc.) antenna feed elements and networks, diplexers, duplexers, etc. In some embodiments, the antenna system 810 comprises printed antenna elements, or discrete elements such as whip antennas, etc. The receivers 820 and transmitters 830 collective provide a transceiver system which is coupled to the antenna system 810. In some embodiments, the transmitter 830 is implemented using one of the exemplary transmitter architectures as discussed above (e.g., FIGS. 1, 6A, and 7, etc.).

The digital processors 840 include one or more processors such as CPUs, microcontrollers, digital signal processors, ASICs, FPGAs, etc., which are configured to control operations of the sensor node 800 and components thereof, and to collect and process sensor data. In particular, in some embodiments, the digital processors 840 include a microcontroller that is configured to generate the digital control signals that are input to the various signal processing stages of the transmitters as shown in, e.g., FIG. 1 to configure the hardware configurations of the stages to change the operating parameters, e.g., adjust gain, control LO frequencies, etc.

The sensors 850 are utilized to capture data within a given environment. For example, the sensors 850 include hardware devices that generate a measurable signal in response to a change in physical conduction such as temperature, pressure, humidity, light, etc. In some embodiments, the sensors 850 generate analog signals that are digitized and processed by a digital signal processor. In some embodiments, the sensor data is transmitted to a remote node by converting the digital sensor data to digital IQ baseband signals (e.g., via element 110, FIG. 1), converting the digital IQ baseband signals to analog baseband voltage signals, and optionally upconverting the analog baseband voltage signals to a higher transmission frequency, and thereby generate an RF output signal via the transmitters 830 for wireless transmission via the antenna system 810.

The memory 860 includes volatile memory (e.g., RAM, cache) which is utilized by the digital processors 840, and non-volatile memory such as flash memory for storing sensor and application related data, and for storing software or code for programming the various components of the sensor node 800 and controlling operations and functions of the sensor node 800.

The power management system 870 comprises various elements such as a power supply (e.g., batteries, capacitors), a voltage regulation circuit, and a power management system such as a dynamic power management (DPM) system which is configured to power down components of the sensor node 800 which are currently inactive and not in use, or a dynamic voltage scaling (DVS) system, which is configured to adjust operating power levels and/or operating frequencies within the sensor node 800 to reduce power consumption.

The clock signal generator 880 comprises various components and circuits to generate and distribute clock signals for operating the sensor node 800. For example, in some embodiments, the clock signal generator 880 implements the LO clock signal generator system 620 as shown in FIG. 6B.

Figure 9:
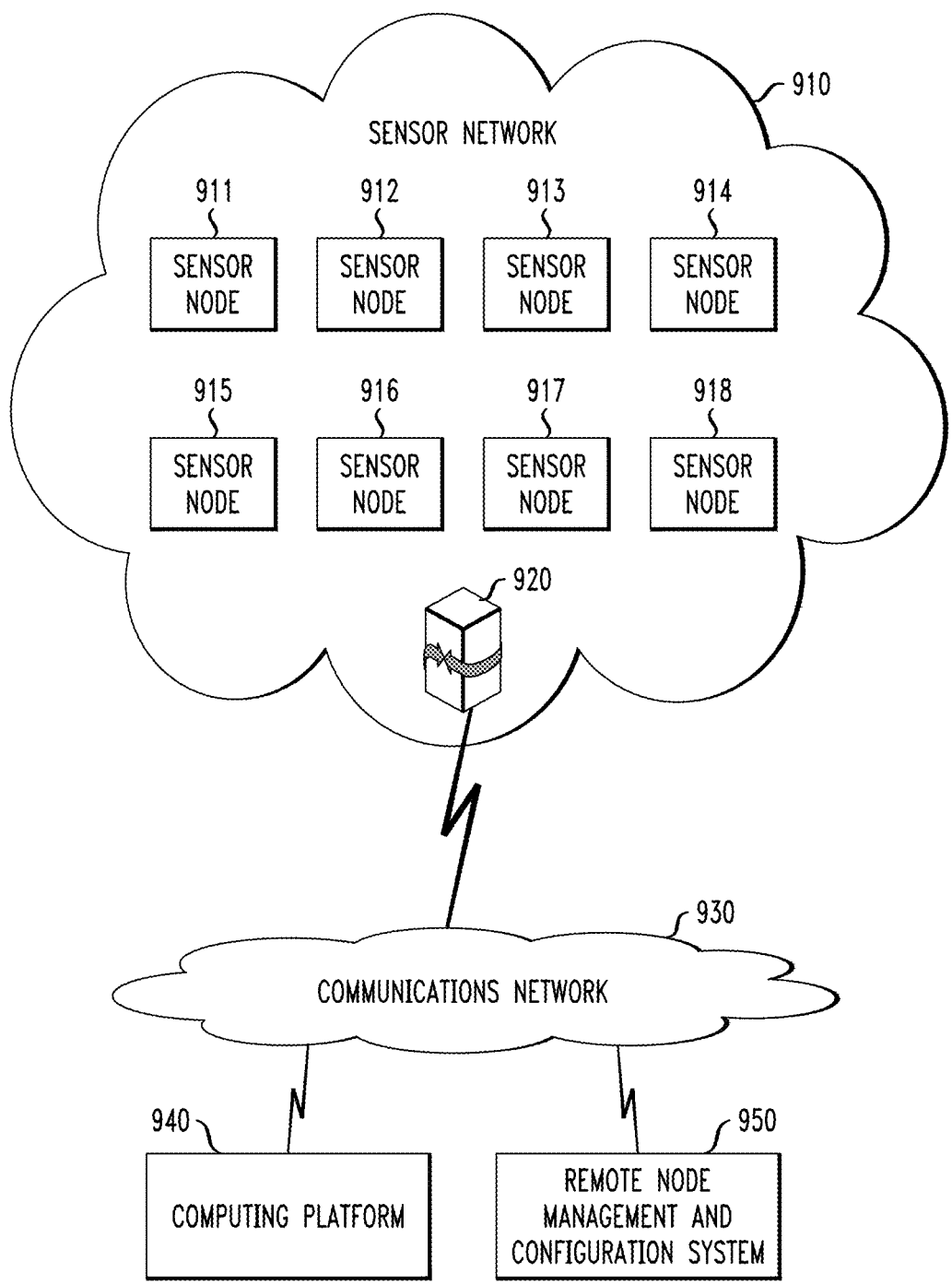
FIG. 9 schematically illustrates a computing system comprising a network of sensor nodes which implements transmitters, according to an exemplary embodiment of the disclosure.

FIG. 9 schematically illustrates a computing system comprising a network of sensor nodes which implements transmitters, according to an exemplary embodiment of the disclosure. More specifically, FIG. 9 is a high-level schematic illustration of a computing system 900 which comprises a sensor network 910, a communications network 930, a computing platform 940, and a remote node management and configuration system 950. The computing platform 940 and remote node management and configuration system 950 are coupled to the sensor network 910 via the communications network 930. The communications network 930 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks.

The sensor network 910 comprises a plurality of sensor nodes 911, 912, 913, 914, 915, 916, 917, and 918 and a gateway 920. The sensor nodes 911, 912, 913, 914, 915, 916, 917, and 918 collectively generate data that is transmitted to, and utilized, by the computing platform 940 to execute one or more applications. In some embodiments, the sensor nodes 911, 912, 913, 914, 915, 916, 917, and 918 each comprises a sensor node framework such as shown in FIG. 8. In some embodiments, sensor network 910 deploys wireless sensor nodes to implement a given Internet-of-Things (IoT) application The computing platform 940 comprises one or more application server nodes and a data storage system, wherein the application server nodes host one or more applications that process the data that is generated by the sensor nodes of the sensor network 910 to provide one or more services. In some embodiments, the computing platform 940 comprises an IoT cloud computing system that is configured to support one or more IoT application domains (e.g., healthcare, energy, manufacturing, etc.). The computing platform 940 manages and processes IoT data received from sensor nodes of the sensor network 910 for a given application domain, or from multiple sensor networks for different application domains. For an IoT application, the computing platform 940 performs data processing and storage functions to support one or more IoT cloud computing applications.

The remote node management and configuration system 950 allows a sensor network administrator to remotely configure the sensor nodes in the sensor network 910. Such configuration includes configuration of reconfigurable hardware in the sensor nodes, and software/firmware configuration of the sensor nodes. For example, in some embodiments, the remote node management and configuration system 950 is configured to allow an administrator to command the microcontrollers of the sensor nodes to selectively configured the signal processing stages of the transmitters of the sensor nodes, as desired, for a given application or deployment environment.

Exemplary embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The block diagrams in the Figures illustrate the architecture, functionality, and operation of possible implementations of systems, methods, and computer program products according to various embodiments of the present invention. In this regard, each block in the block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Figure 10:
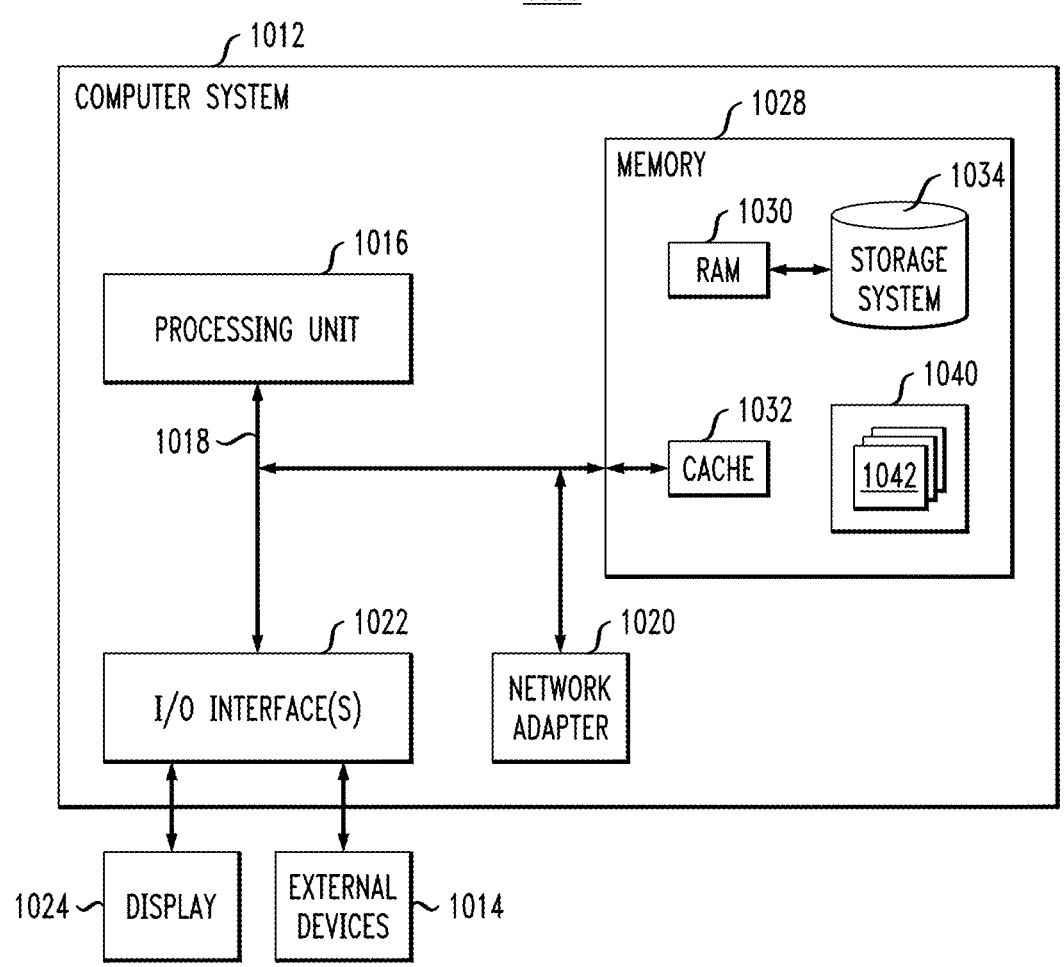
FIG. 10 schematically illustrates an exemplary architecture of a computing node which can host and execute a program for managing and configuring sensor nodes comprising transmitter systems, according to an exemplary embodiment of the disclosure.

These concepts are illustrated with reference to FIG. 10, which schematically illustrates an exemplary architecture of a computing node which can host and execute a program for managing and configuring sensor nodes comprising transmitter systems, according to an exemplary embodiment of the disclosure. In some embodiments, FIG. 10 schematically illustrates a computing node 1000 which is configured to host and execute the remote node management and configuration system 950 of FIG. 9. As shown in FIG. 10, the computing node 1000 which comprises a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

In FIG. 10, computer system/server 1012 in computing node 1000 is shown in the form of a general-purpose computing device. The components of computer system/server 1012 may include, but are not limited to, one or more processors or processing units 1016, a system memory 1028, and a bus 1018 that couples various system components including system memory 1028 to the processors 1016.

The bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1012 typically includes a variety of computer system readable media. Such media may be any available media that is accessible by computer system/server 1012, and it includes both volatile and nonvolatile media, removable and non-removable media.

The system memory 1028 can include computer system readable media in the form of volatile memory, such as RAM 1030 and/or cache memory 1032. The computer system/server 1012 may further include other removable/non-removable, volatile/nonvolatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As depicted and described herein, memory 1028 may include at least one program product having a set (e.g., at least one) of program modules that are configured to carry out the functions of embodiments of the invention.

The program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the disclosure as described herein.

Computer system/server 1012 may also communicate with one or more external devices 1014 such as a keyboard, a pointing device, a display 1024, etc., one or more devices that enable a user to interact with computer system/server 1012, and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, SSD drives, and data archival storage systems, etc.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
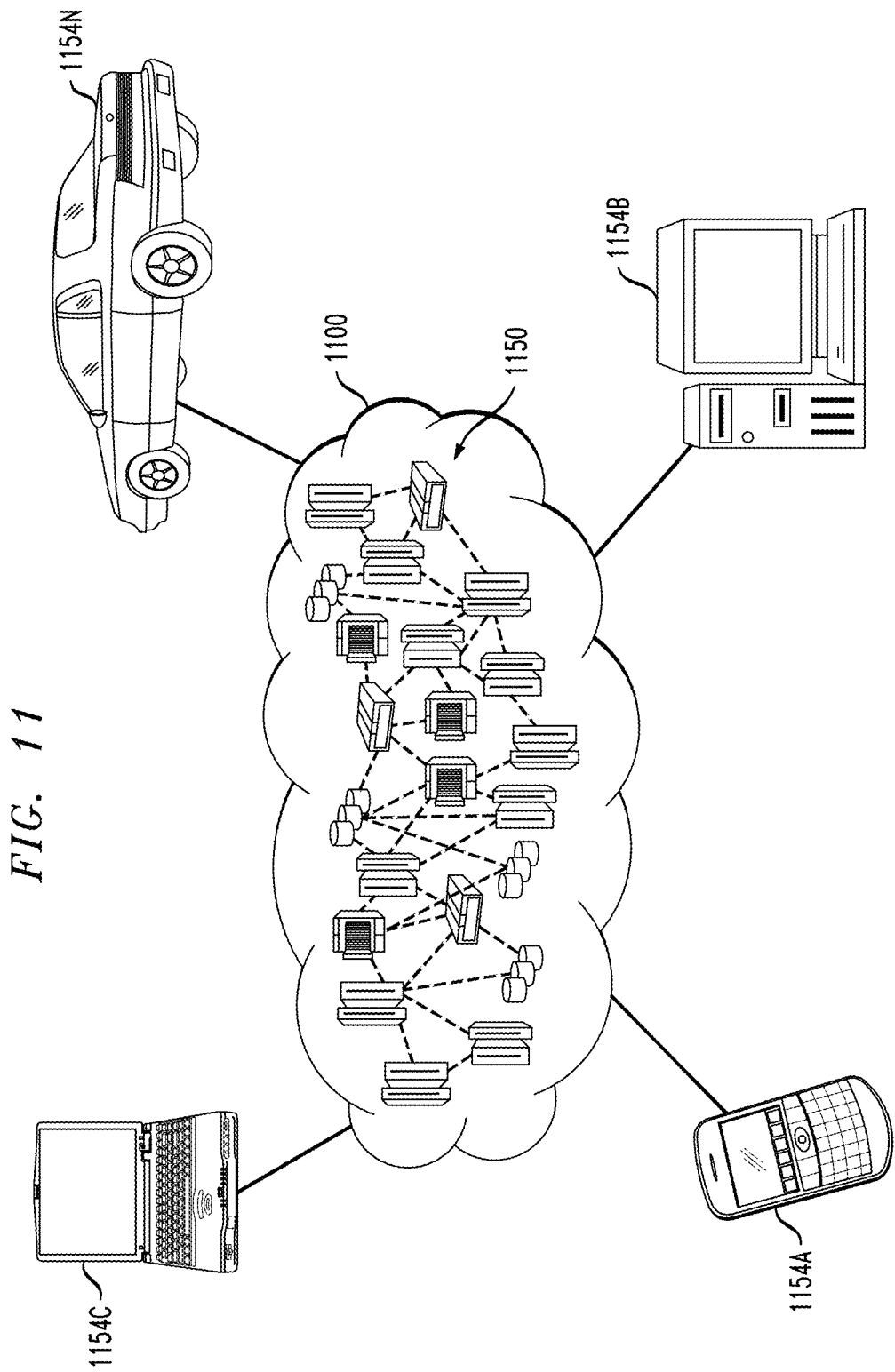
FIG. 11 depicts a cloud computing environment according to an exemplary embodiment of the disclosure.

Referring now to FIG. 11, an illustrative cloud computing environment 1100 is depicted. As shown, the cloud computing environment 1100 includes one or more cloud computing nodes 1150 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1150 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1150 and cloud computing environment 1100 can communicate with any type of computerized device over any type of network and/or network addressable connection (e.g., using a web browser).

Figure 12:
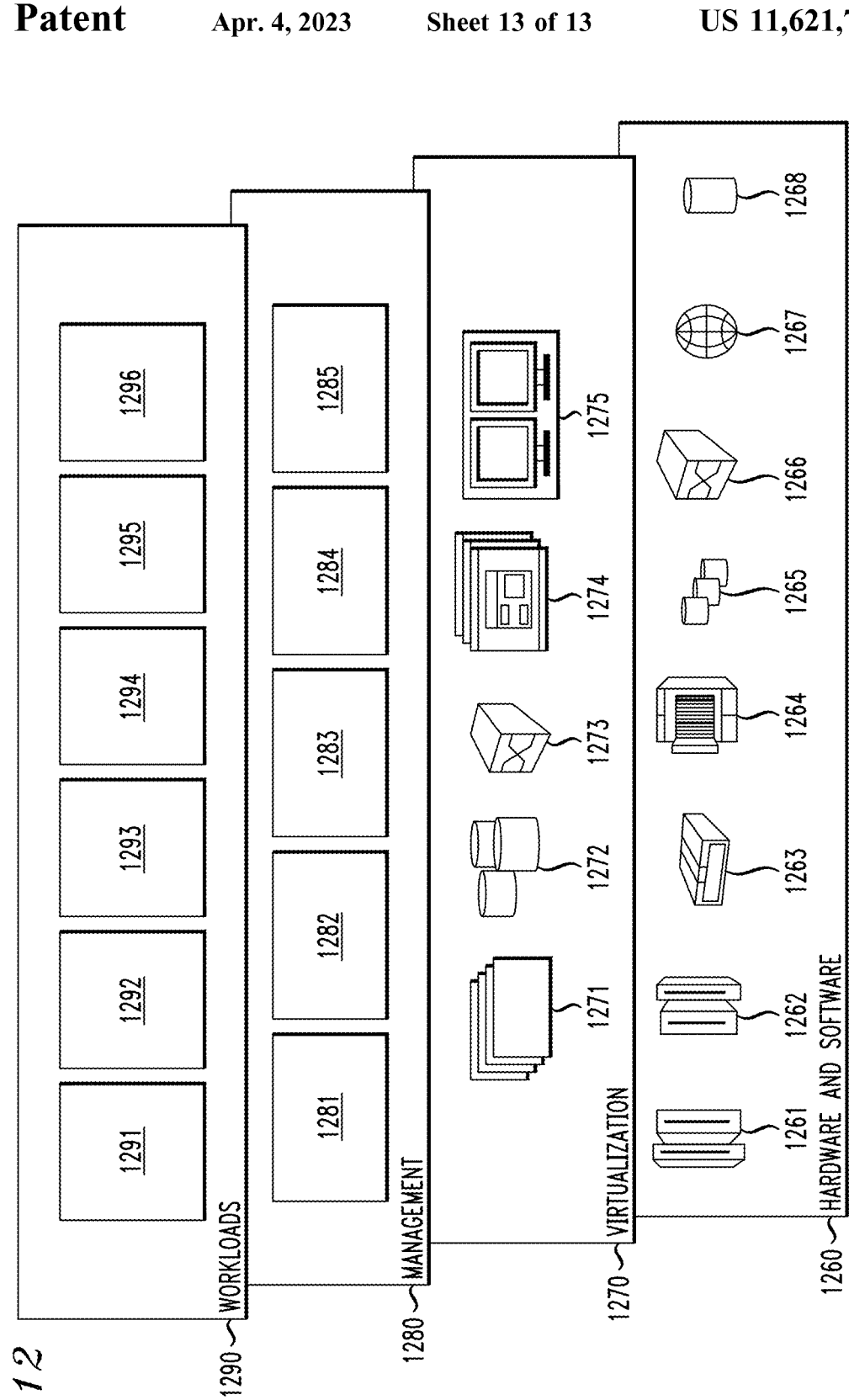
FIG. 12 depicts abstraction model layers according to an exemplary embodiment of the disclosure.

Referring now to FIG. 12, a set of functional abstraction layers provided by cloud computing environment 1100 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and various functions 1296 for selectively configuring operating parameters of signal processing stages of transmitters and other components of sensor nodes and other devices within a sensor network.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
   a plurality of signal processing stages configured to convert a digital baseband signal into an analog radio frequency (RF) signal for transmission, wherein the plurality of signal processing stages are further configured to be operatively coupled to a positive supply voltage and a negative supply voltage;
   wherein at least one signal processing stage of the plurality of signal processing stages is configured to generate and output an analog voltage signal which comprises a voltage level that is one of greater than the positive supply voltage and less than the negative supply voltage, which supply power to the least one signal processing stage.

2. The apparatus of claim 1, wherein the voltage level of the analog voltage signal comprises at least one of: an average voltage level which is less than the negative supply voltage; and a peak voltage level which is less than the negative supply voltage.

3. The apparatus of claim 1, wherein the at least one signal processing stage comprises:
a digital-to-analog converter (DAC) stage which is configured to convert the digital baseband signal into an analog baseband voltage signal on an output node of the DAC stage, wherein the analog baseband voltage signal comprises a voltage level which is less than the negative supply voltage; and
a filter stage comprising an input node that is coupled to the output node of the DAC stage, wherein the filter stage is configured to filter the analog baseband voltage signal and generate a filtered analog baseband voltage signal on an output node of the filter stage, wherein the filtered analog baseband voltage signal comprises a voltage level which is less than the negative supply voltage.

4. The apparatus of claim 3, wherein:
the analog baseband voltage signal comprises a first average voltage level which is less than the negative supply voltage; and
the filtered analog baseband voltage signal comprises a second average voltage level which is less than the negative supply voltage.

5. The apparatus of claim 3, wherein the DAC stage comprises:
a voltage-mode output stage comprising a plurality of output stages coupled in parallel to the output node of the DAC stage, wherein each output stage of the plurality of output stages comprises an inverter and a capacitor coupled between an output of the inverter and the output node of the DAC stage; and
an output capacitor coupled between the output node of the DAC stage and a negative supply voltage node.

6. The apparatus of claim 5, wherein the capacitors of the output stages comprise one of: binary-weighed capacitance values; and unary-weighed capacitance values.

7. The apparatus of claim 3, wherein the filter stage comprises an analog biquadratic low-pass filter, wherein the analog biquadratic low-pass filter comprises:
a transistor comprising a gate terminal, a first source/drain terminal, and a second source/drain terminal, wherein the gate terminal is coupled to the output node of the filter stage, wherein the first source/drain terminal is coupled to a positive feedback path of the analog biquadratic low-pass filter, and the second source/drain terminal is coupled to a negative supply voltage node;
a first resistor coupled between the output node of the DAC stage and a feedback node of the analog biquadratic low-pass filter;
a second resistor coupled between the feedback node and the output node of the filter stage;
a first capacitor coupled in the feedback path between the feedback node and the first source/drain terminal of the transistor; and
a second capacitor coupled between the output node of the filter stage and the negative supply voltage node.

8. The apparatus of claim 3, wherein the at least one signal processing stage further comprises a modulation stage which comprises an input coupled to the output node of the filter stage, wherein the modulation stage is configured to mix the filtered analog baseband voltage signal, which is output from the filter stage, with a local oscillator (LO) signal to thereby generate a modulated voltage signal, wherein the modulated voltage signal comprises a peak voltage level which is less than the negative supply voltage.

9. The apparatus of claim 1, wherein the at least one signal processing stage comprises:
a digital-to-analog converter (DAC) stage which is configured to convert the digital baseband signal into an analog baseband voltage signal on an output node of the DAC stage, wherein the analog baseband voltage signal comprises a voltage level which is greater than the positive supply voltage; and
a filter stage comprising an input node that is coupled to the output node of the DAC stage, wherein the filter stage is configured to filter the analog baseband voltage signal and generate a filtered analog baseband voltage signal on an output node of the filter stage, wherein the filtered analog baseband voltage signal comprises a voltage level which is greater than the positive supply voltage.

10. A sensor node, comprising:
at least one sensor device which is configured to generate sensor data; and
a transmitter which is configured to transmit the sensor data to a remote node, wherein the transmitter comprises a plurality of signal processing stages configured to convert a digital baseband signal into an analog radio frequency (RF) signal for transmission, wherein the plurality of signal processing stages are further configured to be operatively coupled to a positive supply voltage and a negative supply voltage;
wherein at least one signal processing stage of the plurality of signal processing stages is configured to generate and output an analog voltage signal which comprises a voltage level that is one of greater than the positive supply voltage and less than the negative supply voltage, which supply power to the least one signal processing stage.

11. The sensor node of claim 10, wherein the voltage level of the analog voltage signal comprises at least one of: an average voltage level which is less than the negative supply voltage; and a peak voltage level which is less than the negative supply voltage.

12. The sensor node of claim 10, wherein the at least one signal processing stage of the transmitter comprises:
a digital-to-analog converter (DAC) stage which is configured to convert the digital baseband signal into an analog baseband voltage signal on an output node of the DAC stage, wherein the analog baseband voltage signal comprises a voltage level which is less than the negative supply voltage; and
a filter stage comprising an input node that is coupled to the output node of the DAC stage, wherein the filter stage is configured to filter the analog baseband voltage signal and generate a filtered analog baseband voltage signal on an output node of the filter stage, wherein the filtered analog baseband voltage signal comprises a voltage level which is less than the negative supply voltage.

13. The sensor node of claim 12, wherein the DAC stage comprises:
a voltage-mode output stage comprising a plurality of output stages coupled in parallel to the output node of the DAC stage, wherein each output stage of the plurality of output stages comprises an inverter and a capacitor coupled between an output of the inverter and the output node of the DAC stage; and
an output capacitor coupled between the output node of the DAC stage and a negative supply voltage node;

wherein the capacitors of the output stages comprise one of: binary-weighed capacitance values; and unary-weighed capacitance values.

14. The sensor node of claim 12, wherein the filter stage comprises an analog biquadratic low-pass filter, wherein the analog biquadratic low-pass filter comprises:
   a transistor comprising a gate terminal, a first source/drain terminal, and a second source/drain terminal, wherein the gate terminal is coupled to the output node of the filter stage, wherein the first source/drain terminal is coupled to a positive feedback path of the analog biquadratic low-pass filter, and the second source/drain terminal is coupled to a negative supply voltage node which comprises the negative supply voltage;
   a first resistor coupled between the output node of the DAC stage and a feedback node of the analog biquadratic low-pass filter;
   a second resistor coupled between the feedback node and the output node of the filter stage;
   a first capacitor coupled in the feedback path between the feedback node and the first source/drain terminal of the transistor; and
   a second capacitor coupled between the output node of the filter stage and the negative supply voltage node.

15. The sensor node of claim 12, wherein the at least one signal processing stage of the transmitter further comprises a modulation stage which comprises an input coupled to the output node of the filter stage, wherein the modulation stage is configured to mix the filtered analog baseband voltage signal, which is output from the filter stage, with a local oscillator (LO) signal to thereby generate a modulated voltage signal, wherein the modulated voltage signal comprises a peak voltage level which is less than the negative supply voltage.

16. The sensor node of claim 10, wherein the at least one signal processing stage of the transmitter comprises:
   a digital-to-analog converter (DAC) stage which is configured to convert the digital baseband signal into an analog baseband voltage signal on an output node of the DAC stage, wherein the analog baseband voltage signal comprises a voltage level which is greater than the positive supply voltage; and
   a filter stage comprising an input node that is coupled to the output node of the DAC stage, wherein the filter stage is configured to filter the analog baseband voltage signal and generate a filtered analog baseband voltage signal on an output node of the filter stage, wherein the filtered analog baseband voltage signal comprises a voltage level which is greater than the positive supply voltage.

17. A method comprising:
   converting, by a plurality of signal processing stages, a digital baseband signal into an analog radio frequency (RF) signal for transmission, wherein the plurality of signal processing stages are operatively coupled to a positive supply voltage and a negative supply voltage;
   wherein converting the digital baseband signal into the analog RF signal for transmission comprises at least one signal processing stage of the plurality of signal processing stages generating and outputting an analog voltage signal which comprises a voltage level that is one of greater than the positive supply voltage and less than the negative supply voltage, which supply power to the least one signal processing stage.

18. The method of claim 17, wherein converting the digital baseband signal into the analog RF signal for transmission comprises:
   converting, by a digital-to-analog converter (DAC) stage, the digital baseband signal into an analog baseband voltage signal on an output node of the DAC stage, wherein the analog baseband voltage signal comprises an average voltage level which is less than the negative supply voltage; and
   filtering, by a filter stage, the analog baseband voltage signal to generate a filtered analog baseband voltage signal on an output node of the filter stage, wherein the filtered analog baseband voltage signal comprises an average voltage level which is less than the negative supply voltage.

19. The method of claim 18, wherein converting the digital baseband signal into the analog baseband voltage signal on the output node of the DAC stage, comprises:
   inputting digital signals to a plurality of output stages coupled in parallel to the output node of the DAC stage, wherein each output stage of the plurality of output stages comprises an inverter and a capacitor coupled between an output of the inverter and the output node of the DAC stage;
   generating voltages on at least a portion of the capacitors of the output stages in response to the inputting of the digital signals to at least a portion of the inverters; and
   utilizing the generated voltages of the output stage to charge an output capacitor coupled between the output node of the DAC stage and a negative supply voltage node, to generate the analog baseband voltage signal.

20. The method of claim 18, wherein converting the digital baseband signal into the analog RF signal for transmission further comprises:
   mixing, by a modulation stage, the filtered analog baseband voltage signal with a local oscillator (LO) signal to thereby generate a modulated voltage signal, wherein the modulated voltage signal comprises a peak voltage which is less than the negative supply voltage.

* * * * *